United States Patent
Ojanen et al.

(10) Patent No.: US 10,178,553 B2
(45) Date of Patent: Jan. 8, 2019

(54) PROTECTION MECHANISMS FOR MULTI-TIERED SPECTRUM ACCESS SYSTEMS

(71) Applicant: INTERDIGITAL PATENT HOLDINGS, INC., Wilmington, DE (US)

(72) Inventors: Pekka Ojanen, Espoo (FI); Martino M Freda, Laval (CA); Mihaela C Beluri, Jericho, NY (US); Scott Laughlin, Montreal (CA); Tan B Le, New York, NY (US); Jean-Louis Gauvreau, La Prairie (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/682,210

(22) Filed: Aug. 21, 2017

(65) Prior Publication Data

US 2017/0353857 A1 Dec. 7, 2017

Related U.S. Application Data

(63) Continuation of application No. 15/029,176, filed as application No. PCT/US2014/060652 on Oct. 15, 2014, now Pat. No. 9,743,281.

(Continued)

(51) Int. Cl.
*H04L 1/18* (2006.01)
*H04W 12/06* (2009.01)
(Continued)

(52) U.S. Cl.
CPC ......... *H04W 12/06* (2013.01); *H04B 17/354* (2015.01); *H04L 5/0064* (2013.01);
(Continued)

(58) Field of Classification Search
CPC ......... H04W 72/0413; H04W 72/0486; H04W 72/0453; H04W 72/085; H04W 12/06;
(Continued)

(56) References Cited

U.S. PATENT DOCUMENTS

| 2007/0293170 A1* | 12/2007 | Poston | H04W 16/18 455/164.1 |
| 2008/0108365 A1 | 5/2008 | Buddhikot et al. | |

(Continued)

FOREIGN PATENT DOCUMENTS

WO 2015/048756 4/2015

OTHER PUBLICATIONS

Cisco, "Cisco Visual Networking Index: Global Mobile Data Traffic Forecast Update, 2011-2016," (Feb. 14, 2012).

(Continued)

*Primary Examiner* — Phuoc H Doan
(74) *Attorney, Agent, or Firm* — Volpe and Koenig, P.C.

(57) ABSTRACT

A shared spectrum manager (SSM) may enable spectrum access for Tier 2 Users (T2Us) and Tier 3 Users (T3Us) while provisioning quality of access (QoA) in a dynamic shared spectrum environment while ensuring sufficient spectrum and interference protection for Tier 1 Users (T1Us). The SSM may enable new user spectrum authorizations by sending, to a regulator, a request for administrative information, and receiving, from the regulator, a policy and user authorization information for at least one user. The SSM may register a T2U with or without contacting the regulator. The SSM may perform quality based admission control by receiving periodic measurements from a master device of each T2U with an active frequency assignment indicating a Quality of Operation (QoO) experienced by the respective T2U, maintaining a map of an effective QoOs for a plurality (Continued)

of T2Us, and categorizing protection contours associated with each of the plurality of T2Us.

20 Claims, 25 Drawing Sheets

Related U.S. Application Data

(60) Provisional application No. 61/891,225, filed on Oct. 15, 2013.

(51) Int. Cl.
| | |
|---|---|
| *H04W 28/16* | (2009.01) |
| *H04L 5/00* | (2006.01) |
| *H04W 16/14* | (2009.01) |
| *H04W 24/08* | (2009.01) |
| *H04B 17/354* | (2015.01) |
| *H04W 76/11* | (2018.01) |
| *H04W 92/04* | (2009.01) |

(52) U.S. Cl.
CPC ........... *H04W 16/14* (2013.01); *H04W 24/08* (2013.01); *H04W 28/16* (2013.01); *H04W 76/11* (2018.02); *H04W 92/04* (2013.01)

(58) Field of Classification Search
CPC . H04W 48/06; H04W 74/0825; H04W 16/14; H04W 84/042; H04L 5/0053; H04L 5/0055; H04L 5/0057; H04L 67/22; H04L 41/026; H04L 5/0048
USPC ........... 370/329, 252, 280; 342/357.29, 463; 375/146
See application file for complete search history.

(56) References Cited

U.S. PATENT DOCUMENTS

| | | | | |
|---|---|---|---|---|
| 2013/0003591 | A1* | 1/2013 | Novak | H04W 72/085 370/252 |
| 2014/0080535 | A1 | 3/2014 | Gauvreau et al. | |
| 2014/0357218 | A1 | 12/2014 | Andrianov et al. | |
| 2015/0289141 | A1 | 10/2015 | Ghasemzadeh et al. | |
| 2015/0373554 | A1 | 12/2015 | Freda et al. | |

OTHER PUBLICATIONS

Electronic Communications Committee, "ECC Report 205," pp. 1-32 (Feb. 2014).
ETSI, "Reconfigurable Radio Systems (RRS); System requirements for operation of Mobile Broadband Systems in the 2 300 MHz—2 400 MHz band under Licensed Shared Access (LSA)," ETSI TS 103 154 V1.1.1 (Oct. 2014).
ETSI, "White Space Devices (WSD); Wireless Access Systems operating in the 470 MHz to 790 MHz frequency band; Harmonized EN covering the essential requirements of article 3.2 of the R&TTE Directive," Draft ETSI EN 301 598 V1.0.0 (Jul. 2013).
Executive Office of the President—President's Council of Advisors on Science and Technology, "Report to the President—Realizing the Full Potential of Government-Held Spectrum to Spur Economic Growth," (Jul. 2012).
Federal Communications Commission, In the Matter of Amendment of the Commission's Rules with Regard to Commercial Operations in the 3550-3650 MHz Band, Notice of Proposed Rulemaking and Order, FCC 12-248, GN Docket No. 12-354 (Dec. 12, 2012).
Federal Communications Commission, In the Matter of Amendment of the Commission's Rules with Regard to Commercial Operations in the 3550-3650 MHz Band, Further Notice of Proposed Rulemaking and Order, GN Docket No. 12-354 (Apr. 23, 2014).
Federal Communications Commission, In the Matter of: Use of Spectrum Bands Above 24GHz for Mobile Radio Services (GN Docket No. 14-177); Amendment of the Commission's Rules Regarding the 37.0-38.6 GHz and 38.6-40 GHz Bands (ET Docket No. 95-183 (Terminated)); Implementation of Section 309(j) of the Communications Act—Competitive Bidding, 37.0-38.6 GHz and 38.6-40 GHz Bands (PP Docket No. 93-253 (Terminated)); and Petition for Rulemaking of the Fixed Wireless Communications Coalition to Create Service Rules for the 42-43.5 GHz Band (RM 11664), Notice of Inquiry, FCC 14-154 (Oct. 17, 2014).
Federal Communications Commission, Wireless Telecommunications Bureau and Office of Engineering and Technology Call for Papers on the Proposed Spectrum Access System for the 3.5 GHz Band, GN Docket No. 12-354, DA 13-2213 (Nov. 18, 2013).
Goldman, "Sorry, America: Your wireless airwaves are full," Spectrum Crunch: The Cell Phone Industry Hits Its Limits, CNNMoney, Cable News Network, (Feb. 21, 2012).
In the Matter of Amendment of the Commission's Rules with Regard to Commercial Operations in the 3550-3650 MHz Band, GN Docket No. 12-354, Comments of InterDigital, Inc. (Feb. 20, 2013).
Interdigital, "Spectrum Access System for the 3.5 GHz Band," White Paper submitted in response to Public Notice DA 13-2213, GN Docket No. 12-354 (Jan. 2, 2014).
National Telecommunications and Information Administration, "An Assessment of the Viability of Accommodating Wireless Broadband in the 1755-1850 MHz Band," (Mar. 2012).
Qualcomm, "Licensed Shared Access as complementary approach to meet spectrum demands: Benefits for the next generation cellular systems," presented at the ETSI workshop on Reconfigurable Radio Systems, (Dec. 12, 2012).
Radio Spectrum Policy Group 2011, "Report on Collective Use of Spectrum (CUS) and other spectrum sharing approaches," RSPG11-392 Final, (Nov. 2011).
Realizing the Full Potential of Government-Held Spectrum to Spur Economic Growth, PCAST May 25, 2012 Update, pp. 1-12 (Jul. 20, 2012).
The White House, "Presidential Memorandum: Unleashing the Wireless Broadband Revolution," (Jun. 28, 2010).
Wimax Forum, "A Review of Spectrum Requirements for Mobile WiMAX™ Equipment to Support Wireless Personal Broadband Services," pp. 1-45 (Sep. 2007).

\* cited by examiner

PROTECTION MECHANISMS FOR MULTI-TIERED SPECTRUM ACCESS SYSTEMS

CROSS REFERENCE TO RELATED APPLICATIONS

This application is a continuation of U.S. patent application Ser. No. 15/029,176, filed Apr. 13, 2016, which is a 371 National Stage application of PCT/US2014/060652, filed Oct. 15, 2014, which claims the benefit of U.S. Provisional Application No. 61/891,225, filed Oct. 15, 2013, the contents of which are hereby incorporated by reference herein.

BACKGROUND

The growth of wireless traffic has been significant in the last decade. Studies predict that the tremendous worldwide growth in the market size of mobile broadband services will continue. For example, certain predictions estimate that the mobile broadband market may grow from one billion users in 2012 to as many as eight billion users by 2015. In addition, global mobile data more than doubled for the fourth year in a row in 2011, and it may continue to do so through 2016. Thus, additional spectrum may be beneficial and necessary to accommodate increased mobile broadband use.

Spectrum use may be based on exclusive utilization of dedicated bands. Additional spectrum for mobile broadband has been created by re-farming or repurposing of spectrum, for example, by moving incumbents to other bands. Examples of this include the 2.5 GigaHertz (GHz) band in many parts of the world, and more recently with clearing of parts of the ultra-high frequency (UHF) band due to the digital switchover, known as Digital Dividend.

The practice of repurposing has become more difficult and less feasible due to difficulties of finding incumbent services that may be moved to other bands. In particular, repurposing of bands where existing services are widely in use may be an extremely costly and lengthy undertaking, as confirmed by a recent National Telecommunications and Information Administration (NTIA) report that concluded that potential repurposing of the 1755-1850 MegaHertz (MHz) band would take ten years and cost around eighteen billion dollars. As a result, regulators are considering methods other than repurposing to obtain the new spectrum that will solve the bandwidth crunch.

SUMMARY

A shared spectrum manager (SSM) may enable spectrum access for Tier 2 Users (T2Us) and Tier 3 Users (T3Us) while provisioning quality of access (QoA) in a dynamic shared spectrum environment while ensuring sufficient spectrum and interference protection for Tier 1 Users (T1Us). The SSM may enable new user spectrum authorizations by sending, to a regulator, a request for administrative information, and receiving, from the regulator, a policy and user authorization information for at least one user. The SSM may register a T2U with or without contacting the regulator. The SSM may perform quality based admission control by receiving periodic measurements from a master device of each T2U with an active frequency assignment indicating a Quality of Operation (QoO) experienced by the respective T2U, maintaining a map of an effective QoOs for a plurality of T2Us, and categorizing protection contours associated with each of the plurality of T2Us.

BRIEF DESCRIPTION OF THE DRAWINGS

A more detailed understanding may be had from the following description, given by way of example in conjunction with the accompanying drawings wherein.

DETAILED DESCRIPTION

Figure 1A:
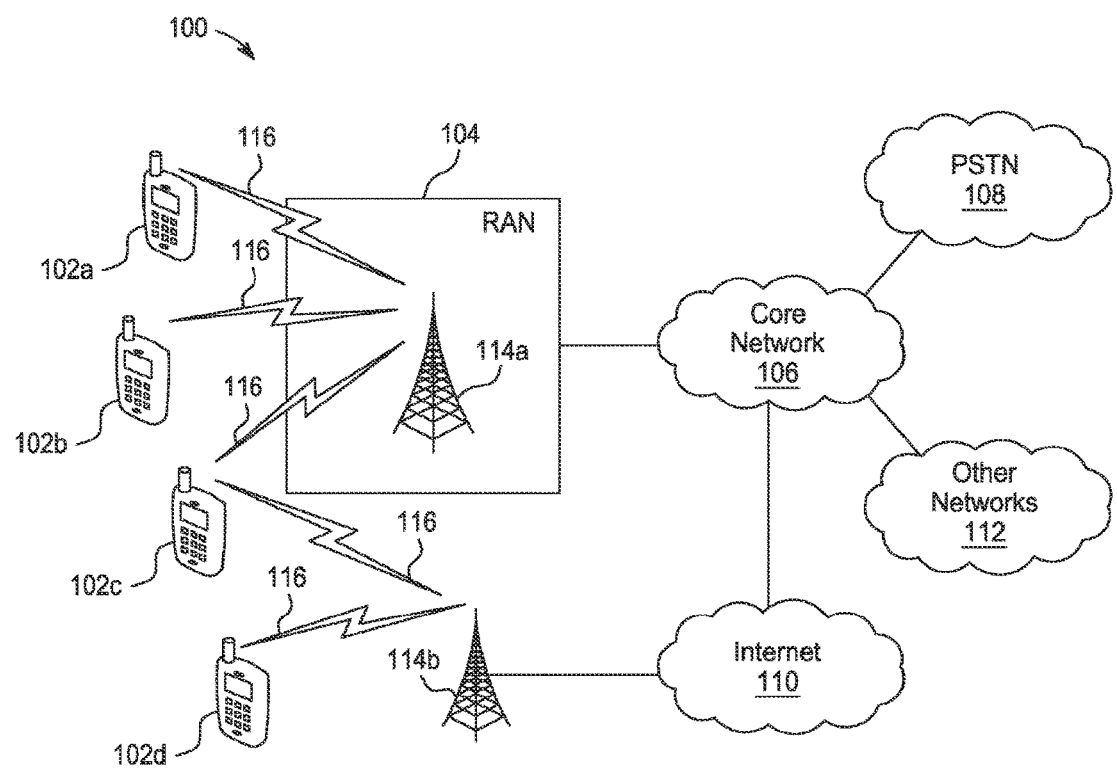
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as Institute of Electrical and Electronics Engineers (IEEE) 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
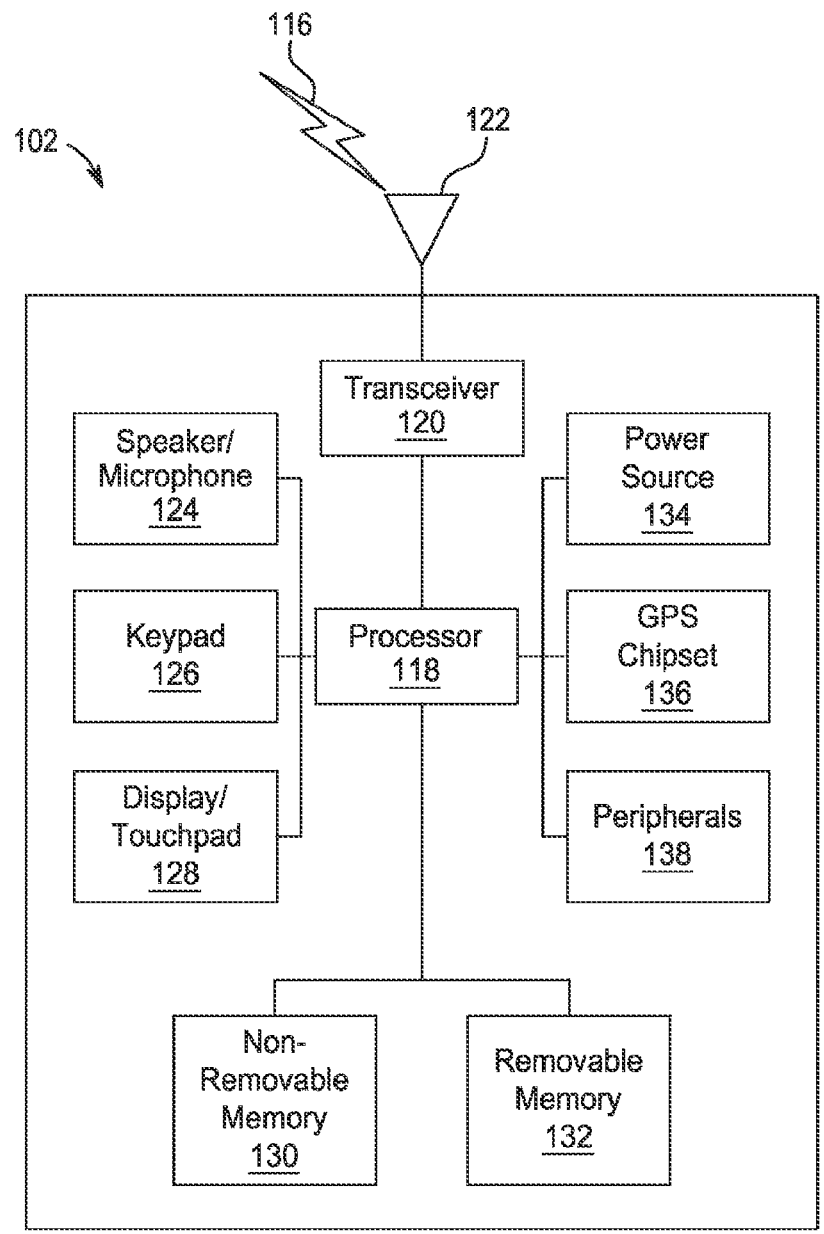
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
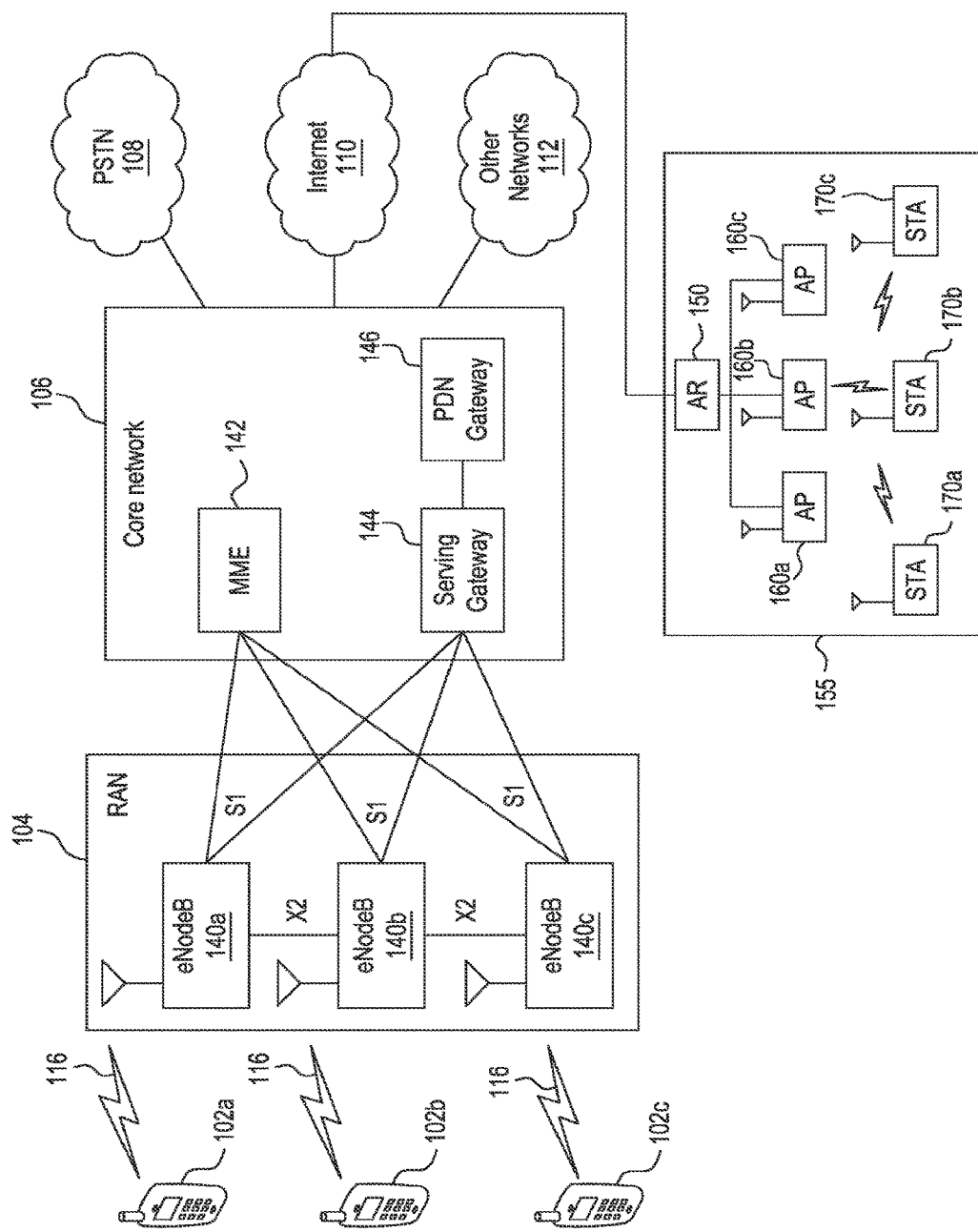
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that may be owned and/or operated by other service providers.

Methods and apparatuses to use shared spectrum are described herein. Spectrum may be shared using a tiered hierarchy (e.g. with two, three, or more tiers of users) and may be used by wireless applications that may need to provide certain Quality of Service (QoS).

Most of the spectrum bands are currently not fully utilized in all places or at all times, and thus portions of spectrum bands may be made available for other use in a shared manner on a geographical and/or time basis. New technical solutions are emerging to enable sharing in bands that were previously not shared. Therefore, sharing is being seen as a feasible mechanism or tool that may complement repurposing and effectively increase the amount of spectrum in use.

The recent advent of small cells may increase the feasibility of spectrum sharing and the amount of new spectrum that may be made into use. The use of small cells makes it easier to reuse a given frequency for geographically separated services, which increases the amount of networks which may share new bandwidth during the times when the incumbent or the government allows for use by other services. Another technical solution to facilitate sharing may be the utilization of cognitive technologies, such as access to geo-location databases and sensing.

Effectively, mobile broadband services accessing shared bands may gain local or shorter term access to spectrum and may provide the same services as those services provided using exclusive spectrum licenses, but without the large costs associated with the purchases of long term exclusive licenses. Accordingly, the use of spectrum sharing may create opportunities for a new set of use cases.

In certain scenarios, there may be incumbent usages that may allow deployment of not only small cells but also larger cells and/or longer term licenses for shared use. This may depend on the nature and deployments of the actual applications and on the frequency bands. In general, the concept of shared access to spectrum, which may effectively make a significant amount of new spectrum available, may enable new entrants to the market, including for example new network operators and virtual network operators, thus increasing competition.

According to an example of shared use of spectrum, Restricted/Limited Access Networks (RLANs) may be deployed in the 5 GHz band, where Dynamic Frequency Selection (DFS) and power control may be employed in order for RLANs to be able the share the band with radars. DFS may be a type of sensing, which may allow RLANs to detect the channels that may be used by the radars and choose channels that are available. Use of DFS may allow RLANs to use the same bands as radars in a dynamic manner and not cause harmful interference to the radars, while avoiding harmful interference from the radars. Power control may help the RLANs to coexist, even when originally there may be no coordination among them.

Use of Television White Space (TVWS) in the ultra-high frequency (UHF) broadcasting band is another example of shared use of spectrum. Certain portions of the spectrum for terrestrial broadcasting may not be used for TV transmissions, mainly due to broadcast network deployment issues. These unused portions of spectrum may be referred to as TVWS. The Federal Communications Commission (FCC) has opened up these TVWS frequencies for a variety of unlicensed uses and the Office of Communications (Ofcom) in the United Kingdom is in the process of doing the same.

Many other administrations are also considering the use of TVWS. These frequencies may be exploited in license exempt manners by secondary users for any radio communication given that such use may not interfere with other incumbents and/or primary users. As the amount and exact frequencies of unused spectrum vary from location to location, specific technical solutions may be employed. Key technical solutions that may be used include, but are not limited to, geo-location of a device and access to a database that may instruct the device about the available channels in the location of the device and/or the maximum allowed transmit power in that location.

The use of Wi-Fi, LTE and other cellular technologies within the TVWS bands has recently been considered, notably in standards bodies such as European Telecommunications Standards Institute (ETSI) Reconfigurable Radio Systems (RRS), ETSI Broadband Radio Access Networks (BRAN), IEEE 802.19, and Internet Engineering Task Force (IETF) Protocol to Access White-Space (PAWS).

In existing solutions for TVWS, there may be no coordination among white space devices (WSDs), as there may only be mechanisms to protect the incumbents. Therefore, additional technical measures may be needed so that the networks based on WSDs may provide QoS.

In contrast to unlicensed approaches to use bands in a shared manner, there is also a licensed approach to spectrum sharing, which in Europe is known as the Licensed Shared Access (LSA). The LSA may be based on a two-tiered model, where Tier 1 users may include various incumbents (e.g. governments, defense, etc.), and Tier 2 users may include users authorized for exclusive use on a shared and binary basis, including time, location and/or frequency, with the incumbent.

Figure 2:
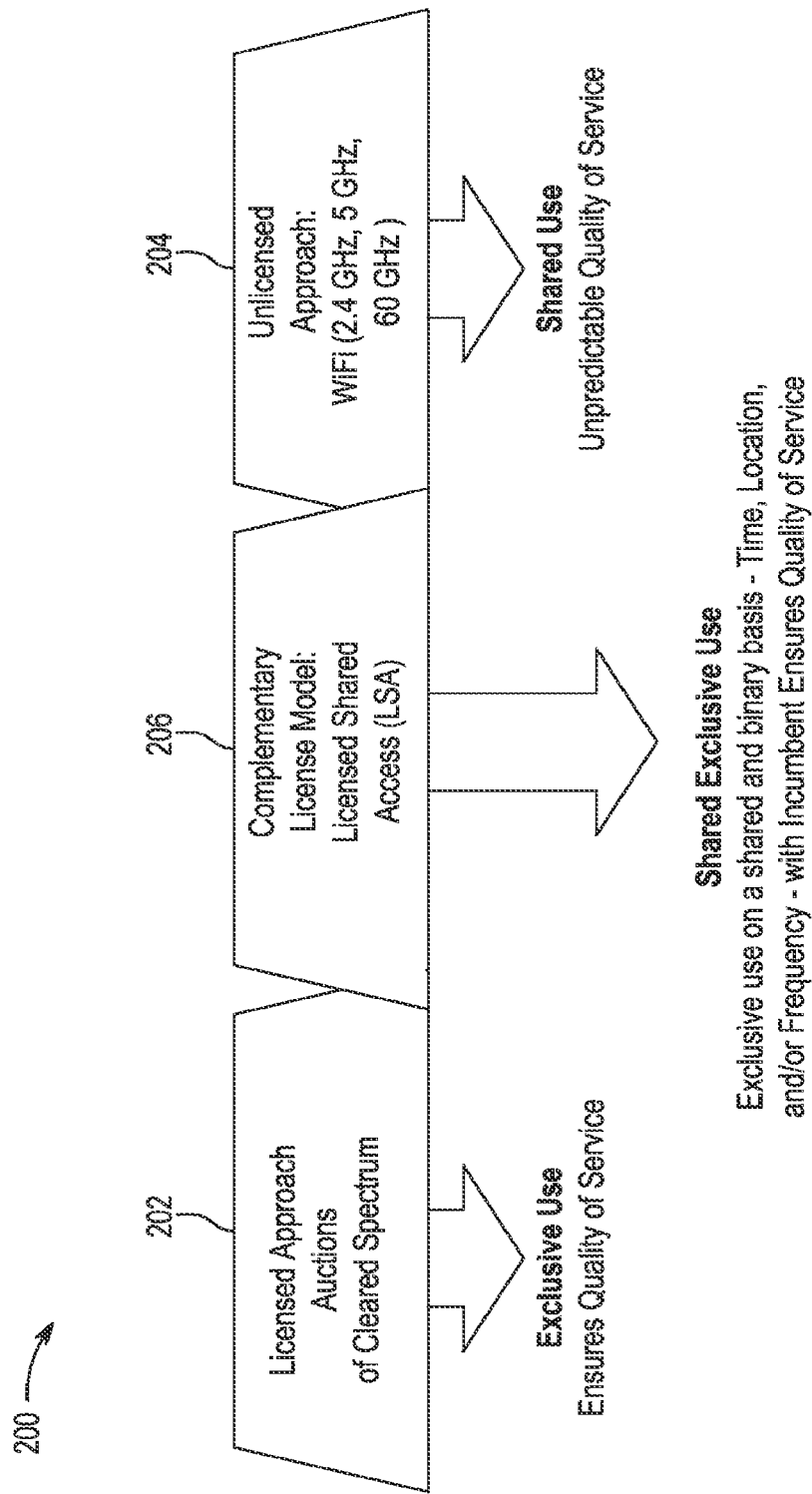
FIG. 2 shows a comparison of example spectrum use models.

FIG. 2 shows a comparison 200 of example spectrum use models, where the example spectrum use models include a licensed approach 202, an unlicensed approach 204, and the LSA 206 complementary license model. The licensed approach 202 may include auctions of cleared spectrum, and may result in exclusive use of spectrum with ensure QoS. The unlicensed approach 204 may include, for example, Wi-Fi over 2.4 GHz, 5 GHz, or 60 GHz, and may result in shared usage with unpredictable QoS.

According to the LSA approach 206 for providing shared exclusive usage, while the current incumbent usage may stay unaffected, the unused portions of the band may be exclusively assigned to a secondary user, such as a mobile broadband operator, or in some cases to two or more operators. The LSA approach 206 may ensure QoS by providing exclusive use to secondary users on a shared and binary basis with the incumbent. If there are more than two LSA licensees, then they may not have exclusive rights to the shared band, and some coordination may be needed between them in order to allow them to provide QoS dependent services.

The LSA framework itself may be technology and band neutral, but in practice it may first be applied to make additional spectrum available for mobile broadband. For example, an initial band where the LSA approach may be employed in Europe is 2300-2400 MHz. In n example, the LSA model may be a good match for Mobile Network Operators (MNOs), who may get capacity enhancement when operating as Tier 2 users in shared spectrum.

Figure 3:
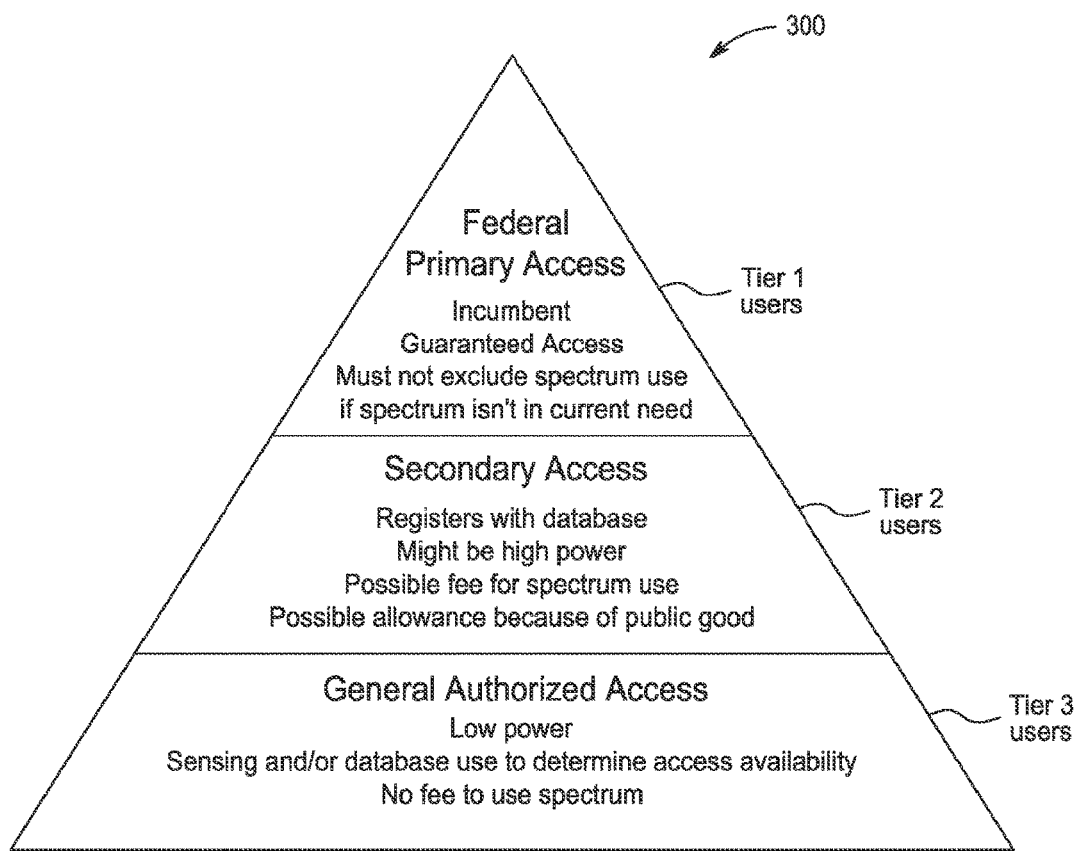
FIG. 3 shows a hierarchical three-tier model for shared spectrum access to federal spectrum.

In the United States, a President's Council of Advisors on Science and Technology (PCAST) report has proposed a hierarchical three-tier access model to enable shared access to the federal spectrum, shown in FIG. 3. As shown in FIG. 3, Tier 1 users may be the incumbents or Federal Primary Access users, may have guaranteed access, and may not exclude spectrum from use if that spectrum isn't in current need. Tier 2 users may be Secondary Access users and may have a lower priority than Tier 1 when accessing the spectrum. Tier 2 users may register with a database and pay a fee to get an individual license for spectrum use with possible allowance provisions of QoS, and may be high power.

Tier 3 users may be General Authorized Access users and may have the lowest priority when accessing the spectrum. Tier 3 users may not pay fees for using the spectrum, which they may use in an opportunistic manner without QoS provisioning and may be low power users. For example, Tier 3 users may use sensing and/or a database to determine access availability.

Figure 4:
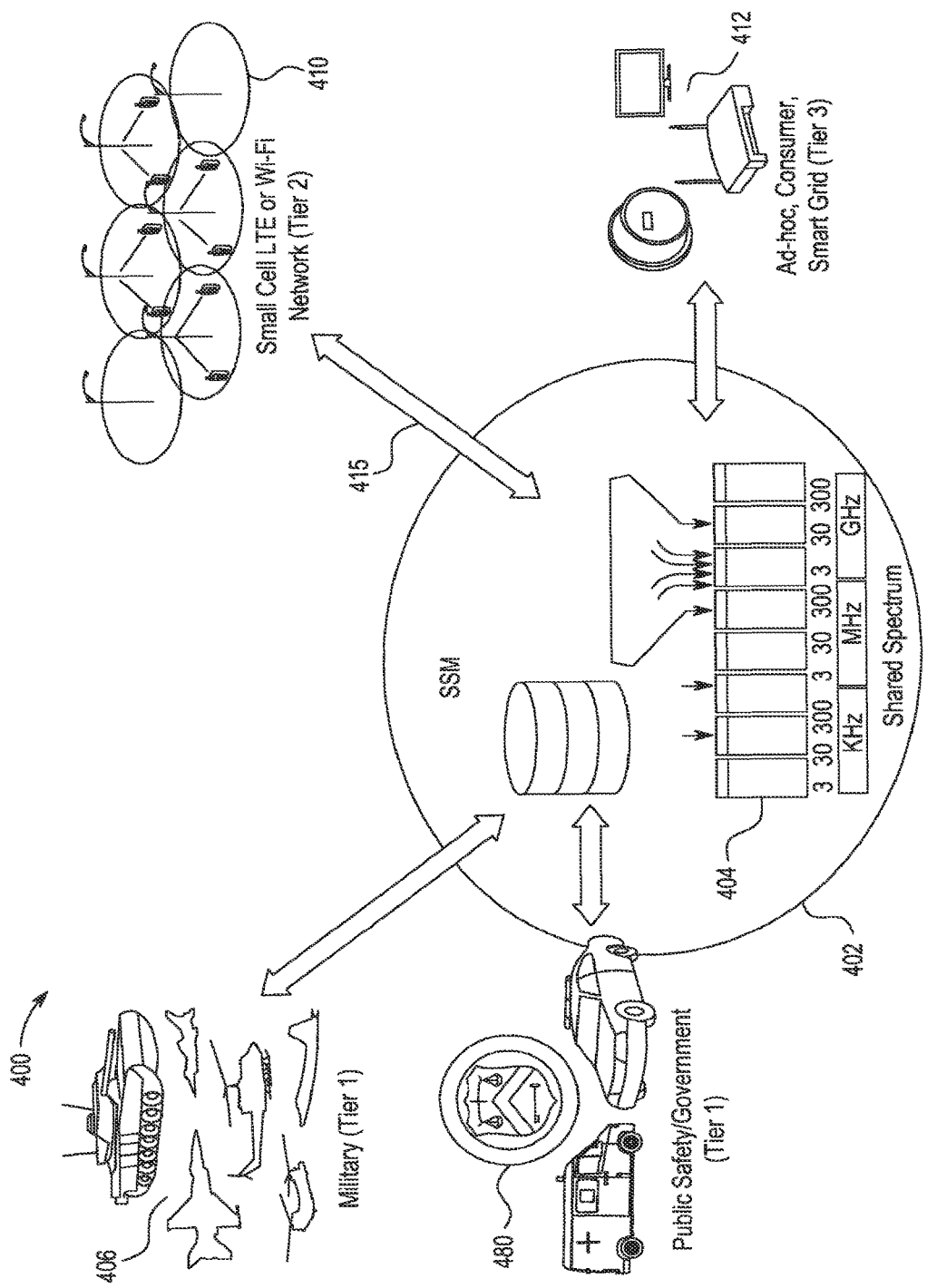
FIG. 4 shows a system diagram of a shared spectrum access system with three tiers of access.

A key feature of the three-tier model is that lower level use may not be allowed to cause harmful interference to higher level use. FIG. 4 shows a system diagram of a shared spectrum access system 400 with three tiers of access, in accordance with the PCAST report. A shared spectrum manager (SSM) 402 may coordinate access to the shared spectrum 404 among the different tiered users. According to one example, shared spectrum access may be employed in the 3550 to 3700 MHz band, which may be used by radars, earth stations of the Fixed Satellite Service and Wireless Internet Service Providers.

Tier 1 users may include, for example, the military 406 and public safety and/or government services 408. Tier 2 users may include, for example, Small Cell LTE or Wi-Fi networks 410. Small Cell or Wi-Fi networks 410 may send a spectrum request 415 to the SSM 402 to gain access to shared spectrum 404. Tier 3 users may include ad-hoc, consumer, and smart grid users 412.

Employing either the PCAST or the LSA model may facilitate QoS provisioning for users sharing the spectrum with incumbents. For example, QoS provisioning may apply, but is not limited to Tier 2 users in the PCAST model, and LSA licensees in the LSA model. The QoS provisioning may be facilitated when only one or few users or operators may get the license for the shared use.

QoS provisioning may be possible in cases where only a limited amount of spectrum users and their spectrum use may be known. The amount of accessible spectrum to the Tier 2 user may be defined, and in case the amount varies over time, a prediction may be given to the Tier 2 user of the timely variance and an assurance of the minimum amount. In a known radio environment, the Tier 2 user may be offered protection from harmful interference. This in turn may allow the Tier 2 user to have guaranteed access to spectrum in a manner that also allows the provisioning of QoS, which are related to Quality of Access (QoA).

QoA may be defined such that the amount of spectrum made available to these applications has to be sufficient over the required time and/or over the required geographical area and/or that the access may need to be protected from harmful interference from other spectrum use.

Another quality related measure is Quality of Operation (QoO), which may define the quality metric influenced by the use of the shared spectrum or a specified portion of the shared spectrum. The term may refer to, but is not limited to: signal-to-noise ratio, capacity, throughput, frame or bit error rate, time of operation or spectral efficiency obtained over the spectrum. The QoO of a user may reflect the usability of the spectrum used by that particular user.

Access to spectrum may be exclusive or shared. For example, in the case of one Tier 2 user or one LSA licensee, it may have exclusive rights to use the portions of spectrum that may not be used by the incumbent. For example, in case of two or more Tier 2 users or LSA licensees, they may need to share the unused portions of the band. In that case, an arrangement or protocol may be needed to facilitate QoS provisioning.

The ability to provide QoS may be a very important aspect for mobile broadband operators, as some of the services they offer have requirements for certain QoS. This may have an impact on the value of the band and on the use cases and applications to be deployed.

Figure 5:
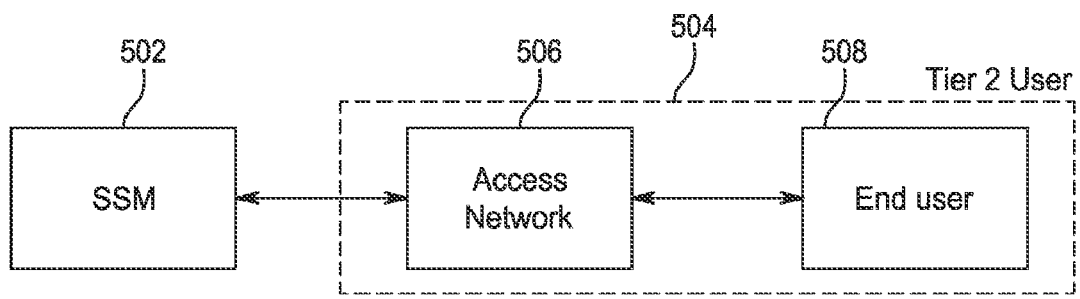
FIG. 5 shows a block diagram of an example shared spectrum system for providing Quality of Service (QoS) and Quality of Access (QoA) to Tier 2 Users.

Architecture and procedures may be developed for shared spectrum access and/or for a shared spectrum manager (SSM). For example, a centralized SSM may manage spectrum from a multitude of bands, coming from incumbents (e.g. Tier 1 users), and made available for Tier 2 and Tier 3 users. With some enhanced functionalities, the SSM may make spectrum available for Tier 2 Users in a manner that may provide QoS provisioning. FIG. 5 shows a block diagram of an example shared spectrum system 500 for providing QoS and QoA to Tier 2 Users. The example shared spectrum system 500 shows an SSM 502 and a Tier 2 User 504, and may include other users and network entities that are not shown. The end user 508 of the Tier 2 User 504 may communicate with the access network 506, which may communicate with the SSM 502. The SSM 502 may provide the Quality of Access functionality. For example, the SSM 502 may make sufficient spectrum available and ensure interference protection from other Tier 2 and/or Tier 3 Users.

The access network 506 may provision services to the end user 508, and may provide QoS via QoS Mechanisms. For example, the access network 506 may provide feedback to the SSM 502 on the QoA experienced by the Tier 2 User 504, which may be for example based on measurements such as: average cell throughput, per cell average noise and interference level.

The end user 508 may provide feedback on QoS to the access network entity 506, which may be for example based on measurements, including, but not limited to: signal to noise and interference ratio, noise or interference level. The individual noise and interference measurements provided by the end users 508 may be averaged by the access network entity 506 across all end users 508 that operate in that cell, to generate the per cell average noise and interference level.

Shared spectrum use may be a major solution to the continuously increasing spectrum shortage. It may allow a significant increase to the efficiency of overall spectrum use because currently unused portions of spectrum may be taken into use by various wireless applications. However, technical, economical and regulator challenges may affect the potential of shared spectrum.

Applications of shared spectrum use may be based on a primary-secondary configuration. For example, the secondary use may include spectrum use in an unlicensed manner or by horizontal sharing where all use is unlicensed and there is no coordination among the users. For example, the use of Television White Space (TVWS) may be based on a non-interfering, no-protection approach. Such spectrum use may be suitable only for some applications. However, wireless applications that may require more spectrum, such as mobile broadband, may need to employ mechanisms that allow provisioning of QoS and may put specific requirements on their shared spectrum access, such as QoA.

Thus, technical spectrum management solutions may be needed with capabilities for managing shared spectrum use in a dynamic multisystem environment while providing the required QoA.

In order to be able to provide QoA for Tier 1 and 2 users, the SSM may need to control the admission of the Tier 2 Users and Tier 3 User (which may be referred to as T2Us and T3Us) in a manner that some or all additional access to the available bands is under its control. The assignments may need to be done by the SSM based on the actual characteristics of the devices and the actual network deployments, facilitating protection of Tier 1 and Tier 2 users from harmful interference. Additionally, the assignments may be updated based on changes in the requirements and radio environment, so that the QoA may be maintained.

Mechanisms for the SSM may allow spectrum access for Tier 2 and Tier 3 users and the provisioning of QoA for Tier 2 Users in a dynamic shared spectrum environment while ensuring the sufficiency of spectrum for the Tier 1 Users and their protection from harmful interference. The SSM may use those mechanisms in accordance with the possible policies issued by the regulator. The SSM may assign the requested amount of the available spectrum for the Tier 2 and Tier 3 users while also prioritizing the Tier 2 use based on the technical characteristics and the protection criteria of a particular system, the amount of spectrum made available by Tier 1 users, and the spectrum needs announced by Tier 2 and 3 users. The assignments may be updated automatically and optimized by the SSM during their validity time if the spectrum requirements, radio environment or the policy may change.

The SSM mechanisms may contain specific QoA provisioning related functionalities on top of the spectrum request and assignment mechanisms as described above. The QoA may mean that the amount of spectrum made available to Tier 2 Users has to be sufficient over the required time and over the required geographical area and that the access MAY need to be protected from harmful interference from other spectrum use.

QoA provisioning mechanisms for Tier 2 Users may include, but are not limited to the following exemplary embodiments. According to an embodiment, admission control mechanisms for T2Us and T3Us may allow the SSM to have full control over the spectrum usage and the radio environment. According to another embodiment, admission control mechanisms may include authorizations, registrations and spectrum assignments. According to another embodiment, an administrative procedure and interface may be used between the SSM and the regulator, and may include new authorization approaches. According to another embodiment, an admission control mechanism may be based on QoO levels of T2Us.

According to another embodiment, mechanisms protect Tier 1 Users (T1Us) and T2Us from harmful interference from lower tiers. Protection of T1Us from harmful interference is a fundamental aspect of the shared spectrum use concept. Protection mechanisms may assist in making unused portions of T1U spectrum available for shared use while guaranteeing a QoA of the T1Us. Furthermore, protection of T2Us from harmful interference may be provided as part of provisioning of QoA for the T2Us. According to an embodiment, use of time-varying protection contours and coverage contours may be applied to a multitude of devices or device categories. According to another embodiment, the SSM may take into account other applications that operate in bands adjacent to those that the SSM manages or in the adjacent geographical area(s), which may be facilitated by the administrative procedures.

According to another embodiment, mechanisms for individual spectrum assignments may be based on spectrum requests from T2Us and for spectrum reassignments based on, for example, changes in spectrum use, spectrum environment, and/or spectrum requirements. Spectrum assignment mechanisms may be an important part of QoA provisioning to the T2Us because sufficiency of spectrum and interference free operation may be essential to T2Us. Spectrum assignment mechanisms may also facilitate maintaining the QoA for T2Us in a changing radio environment.

According to another embodiment, a spectrum buffer may be used to facilitate immediate assignments and reassignments. Buffer dimensioning may be based on, for example, traffic predictions done by the SSM and may use traffic and spectrum use reports from the users. According to another embodiment, technology specific and/or time-varying protection contours and coverage contours may be used in determining the allowed locations and coverage of Tier 2 and Tier 3 systems and/or users. According to a pixel based approach, radio quality maps may be created from interference measurements and utilization in connection with information about a Tier 2 User's technologies and deployments. This approach may allow prioritization of low interference channels and avoidance of channels with potentially harmful interference, for example in determining the assignments for QoS critical services.

According to another embodiment, measurements of analogue front end adjacent channel leakage power may be used to identify interference and to facilitate suppression of interfering transmissions. According to another embodiment, a QoA resolution process may be used by the SSM to solve QoA events, comprising, but not limited to the following actions: reassignment, evacuation, and reimbursement. According to another embodiment, user category and/or band specific, time to live (TTL) based control signaling may manage the time aspect of spectrum assignments and reassignments. This approach may facilitate timely spectrum reclaim and agile reassignments. According to another embodiment, mechanisms may deal with T1U spectrum reclaiming.

According to another embodiment, mechanisms may provide a limited degree of QoA to T3Us. Mechanisms to facilitate some level of QoA for the T3Us may include, but are not limited to, reserving a predetermined portion or a certain amount out of the spectrum made available by the T1U for shared use and assigning spectrum to the T3Us so that their assignments may be spread evenly across the available spectrum. Mechanisms for multi-tiered shared spectrum access are described in further detail below.

A process may facilitate the provisioning of QoA in a dynamic shared spectrum environment. The operation of the SSM may include, but is not limited to, any of the following processes: an administrative procedure; registration of all involved users; spectrum offers; spectrum requests and/or assignments; and/or spectrum reassignments. The QoA provision may be taken into account in any or all of these processes, which are described in further detail below.

According to an embodiment, an administrative procedure may be used. The SSM may use information and guidance from a regulator, which may include an administrative phase for communication between the SSM and the regulator. This administrative phase may occur, for example, before the SSM starts its operation that manages shared spectrum to make it available and allow provisioning of QoA for priority users (e.g. T2Us). The administrative phase may provide the initial information that the SSM may use to establish its operation. Changes to information occurring during the operation of the SSM may be updated by the regulator.

According to an embodiment, a T1U registration phase may include registering each T1U with the SSM. T1U registration may include, but is not limited to, collecting information about the T1Us and their technologies, including for example transmit and receive characteristics, technical deployment characteristics and protection criteria. Ensuring continuous protection of T1Us and allowing evolution of T1U services over time may be used as prerequisites for making the spectrum unused by T1U available for other uses and users. If the T1U is not protected from harmful interference, it may not be willing to make spectrum available for shared use. The SSM may update its technical database according to the received information. In an example, the T1U registration phase may be done in connection with a T1U spectrum offer phase, for example, the first T1U spectrum offer phase.

In case the T1U uses spectrum in a confidential or classified manner, the regulator may act as a proxy and deliver to the SSM information about the available spectrum and the associated restrictions on the use of that spectrum for lower tier users. In such a case, the T1U may not need to register at the SSM.

According to another embodiment, a T1U spectrum offer phase may enable T1Us to inform the SSM about the spectrum that they may make available for lower tiers. The SSM may add the available bands and their characteristics to its database, for example.

Figure 6:
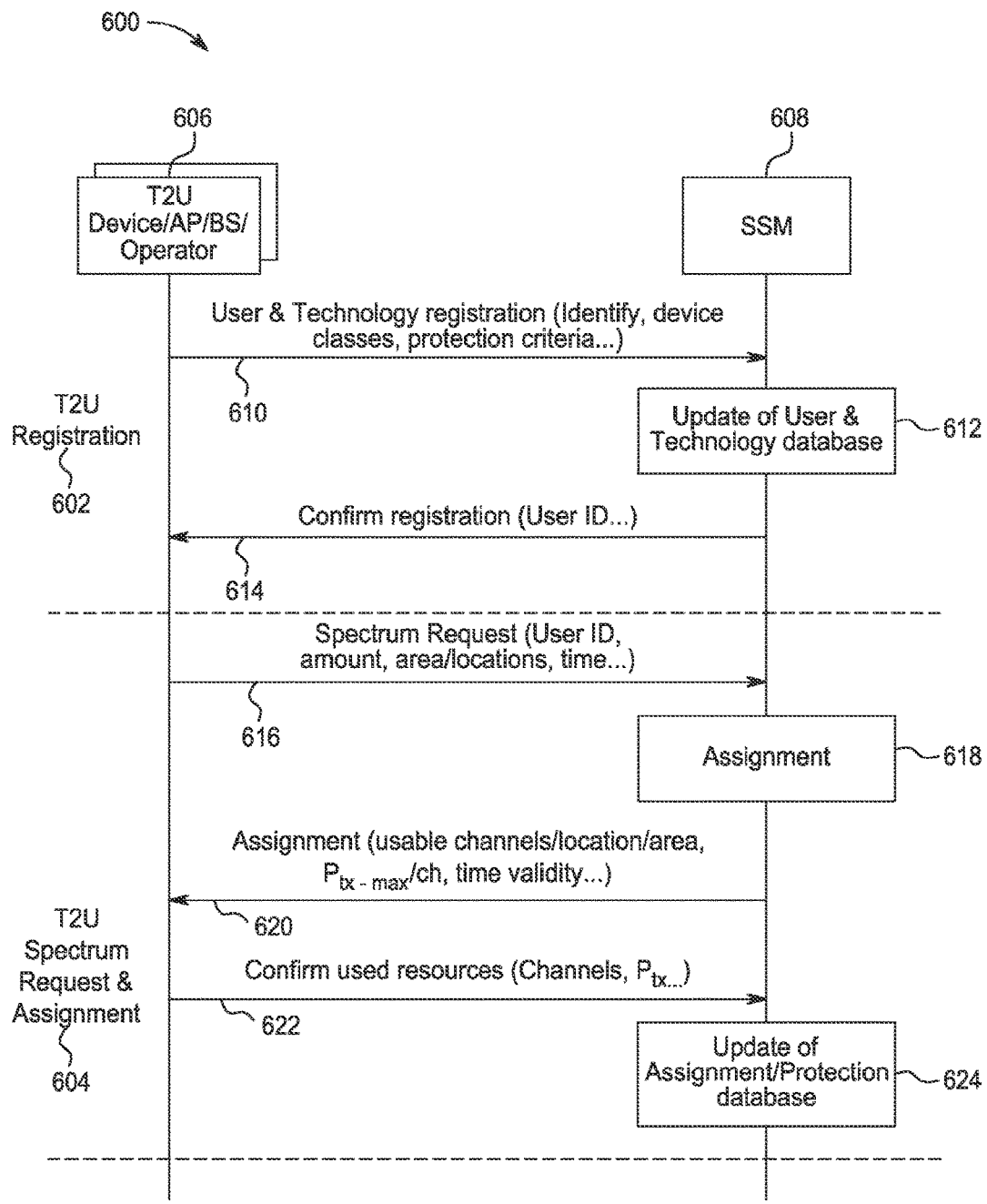
FIG. 6 shows a signal flow diagram of an example procedure including a T2U registration phase, and a T2U spectrum request and assignment phase between at least one T2U and an SSM.

FIG. 6 shows a signal flow diagram of an example procedure 600 including a T2U registration phase 602, and a T2U spectrum request and assignment phase 604 between at least one T2U 606 and an SSM 608. The T2U 606 may be, for example, a device, AP, BS and/or operator. A T2U registration phase 602 may include registering T2Us and collecting information about the T2Us and their technologies including, but not limited to, transmit and receive characteristics, technical deployment characteristics, and protection criteria. The T2U 606 may send a user and technology registration message 610 to the SSM 608. For example, the user and technology registration message 610 may include, but is not limited to following information for the T2U 606: identity, device class and/or protection criteria.

Protection of T2Us from harmful interference may be an important element of the QoA provision. The SSM 608 may update its user and technology database 612 according to the information received from the T2U 606. Unless there is no advance authorization from the regulator of the T2U, an individual authorization may be needed. Accordingly, the SSM 608 may contact the regulator (not shown in FIG. 6) on behalf of the T2U 606 and may apply for an individual authorization for the T2U 606, such that the SSM 608 may act with the permission of the regulator.

In an example, the SSM 608 may be authorized to issue the individual authorizations on behalf of the regulator. In this case, the regulator may have communicated the associated authorization criteria and other necessary guidance for issuing the authorizations during the administrative phase. The SSM 608 may send a confirm registration message 614 to the T2U 606 to confirm registration, such that the confirm registration message 614 may include, but is not limited to a user identification (ID). It may be noted that while some emerging standards, like IETF PAWS, may include a registration phase, they may not address the protection criteria. The T2U registration phase 602 may be combined with the T2U spectrum request and assignment phase 604, as described below.

The T2U spectrum request and assignment phase 604 may be initiated by the T2U 606 by sending a spectrum request message 616 to request spectrum from the SSM 608. The spectrum request message 616 may include, but is not limited to, any of the following information: an amount of required channels and/or bandwidth, and information about the intended deployment, user ID, area and/or locations, and/or time. The QoA aspect may be provided by the SSM 608 by way of an assignment 618 of sufficient spectrum for the T2U 606 and by ensuring protection of the T2U 606 from harmful interference. For example, the SSM 608 may ensure that there is no harmful interference to the T2U 606 from T1Us, other T2Us, T3Us, and/or applications in adjacent bands (e.g. outside of frequencies managed by the SSM 608) or in adjacent geographical locations. Furthermore, the SSM 608 may ensure that there is no harmful interference and/or operational limitations to T1Us.

The SSM 608 may send an assignment message 620, which may include, but is not limited, any of the following information regarding the assignment: usable channels, geographical location, area of operation, maximum allowable transmit power in the channel ($P_{tx-max}$/ch), and/or the validity time of the assignment. The T2U 606 may send a confirmation message 622 to confirm used resources, indicating, for example, the channels and/or transmit power $P_{tx}$ for the user resources. Based on the confirmation message 622, the SSM 608 may update its assignment and/or protection database 624.

According to an embodiment, a T3U spectrum request and assignment phase may be used for registration of the technology and deployment used by T3U(s). If a pixel based approach is in use, T3U spectrum request and assignment phase may include making transmit and deployment characteristics (for example, including transmitter locations) available for the SSM, which may be needed to ensure the protection of T1Us and T2Us from harmful interference from the T3Us. In return, the SSM may inform the T3U(s) regarding the locally available channels and/or allowed transmit powers. In an example, devices with pre-defined emission characteristics (e.g. predefined device categories) may be allowed to be used in certain frequencies in certain areas, such as inside a contour. Depending on the policy issued by the regulator, a T3U may also be required to register individually. The T3U spectrum request and assignment phase may be relevant to the TVWS assignment process defined by the Conference of European Postal & Telecommunications (CEPT) or used in the United States.

According to an embodiment, a spectrum reassignment phase may be used in connection with possible changes in spectrum requirements or radio environment so that a QoA may be maintained during a portion or the whole duration of the assignment. According to an example scenario, a T1U may need some or all of its spectrum back for its own use, which may be indicated by a T1U spectrum reclaim. In this case, spectrum reassignment may to be performed so that spectrum may be reassigned to the T1U and, if possible, to the T2U.

According to an embodiment, an administrative phase and communication may be defined between the SSM and the regulator. The regulator may comprise an automated and/or non-automated entity managed by the regulator, including, but not limited to, a database, active entity, human interface and/or secure website.

An administrative procedure may provide the SSM with essential operational information before the actual spectrum requests and assignments can take place. The administrative procedure phase may be for communication between the regulator and the SSM to authorize the SSM to communicate the relevant policies and possible information about the issued authorizations of the involved players. Depending on the policy of the regulator, the SSM may be authorized to issue individual authorizations on behalf of the regulator to the users that request access to spectrum, and in that case the SSM may need the authorization criteria from the regulator.

The SSM may also get information about the spectrum use within its geographical coverage area in bands adjacent to the bands that it may manage and on the co-channel spectrum use adjacent to its geographical coverage. The SSM may store this information in its database(s). The administrative phase may be repeated periodically or on a need basis, for example if the policy or the use in the adjacent frequencies changes in line with the policy issued by the regulator. The administrative procedure may include the SSM reporting to the regulator about the spectrum management activities, spectrum usage, and interference incidents that may have taken place.

The policy obtained by the SSM from the regulator may contain a list of T2Us and/or T3Us that are authorized to use the services of the SSM. For example, an operator may request the authorization to use shared spectrum from the regulator in its country. If the request is successful, the regulator may allow the operator to have access to shared spectrum in a specific band, geographical region, and/or time period. This authorization may then be indicated to the SSM within the administrative procedure. When that specific operator makes a request for spectrum from the SSM, the SSM may then assign spectrum to the operator based on the information obtained during the administrative procedure.

The policy received at the SSM from the regulator may also be used by the SSM to prioritize the different T2Us and/or T3Us in terms of spectrum to be assigned to each, or to define a maximum amount of spectrum per T2U and/or T3U in situations where there is a scarcity of spectrum.

Figure 7:
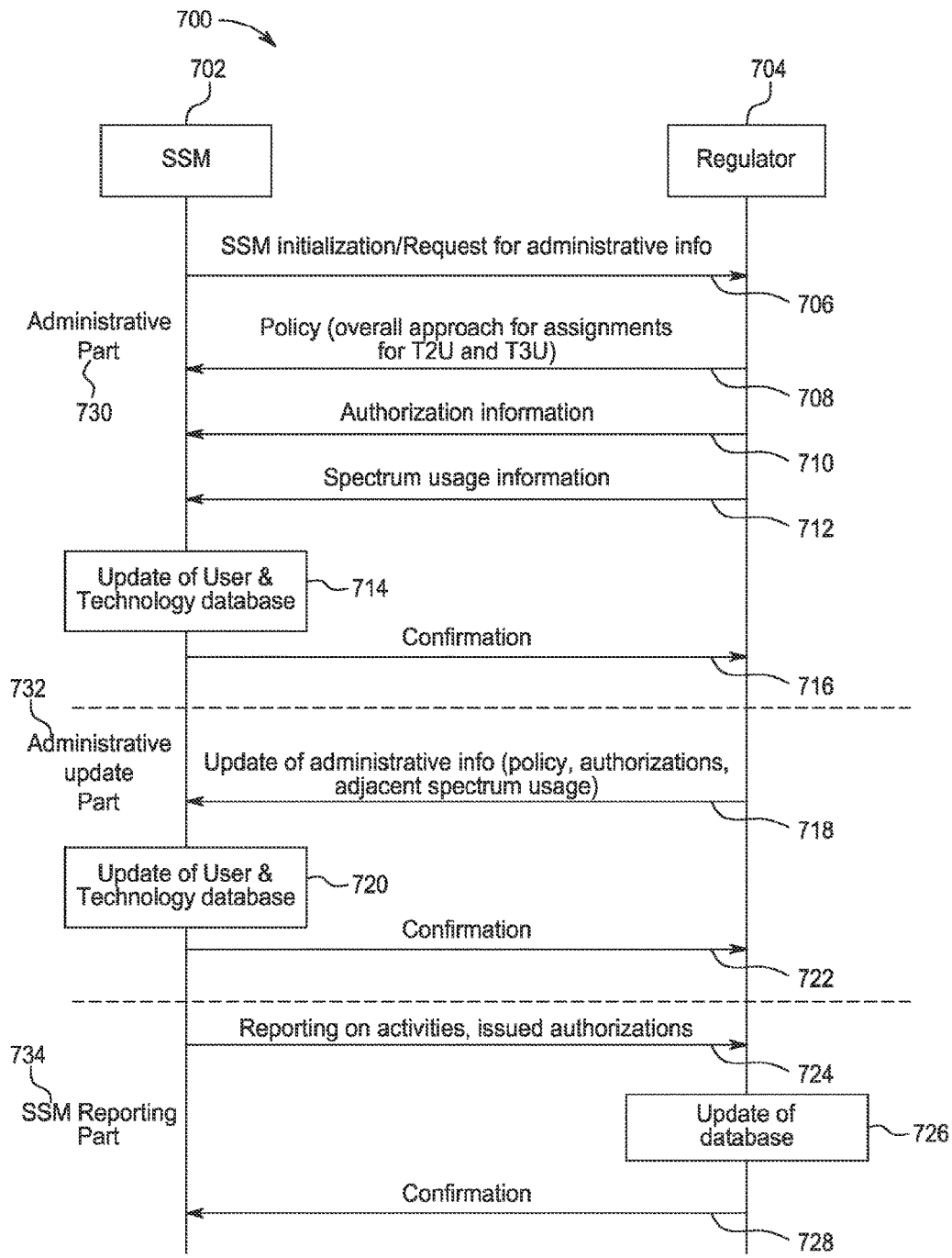
FIG. 7 shows a signal flow diagram of an example administrative procedure between an SSM and a regulator.

FIG. 7 shows a signal flow diagram of an example administrative procedure 700 between an SSM 702 and a regulator 704. The administrative procedure 700 may include an administrative part 730, an administrative update part 732, and an SSM reporting part 734.

As part of the administrative part 730, the SSM 702 may initialize and contact the regulator 704 by sending a request for the administrative information, 706. The regulator 704 may respond by sending a policy message 708 that may indicate the applicable policy that contains the guidance for the SSM 702 and the overall approach for the assignments for T2Us and/or T3Us. For example, the information in the policy message 708 may include, but is not limited to: the priorities related to the different users, how to make spectrum available for users in each tier, timing issues, and/or reclaim requirements.

The regulator 704 may send user authorization information 710 to the SSM 702. For example, when the regulator 704 deals with the authorizations of some or all users, it may communicate to the SSM 702 the issued authorizations thus far. In another example, the regulator 704 may authorize the SSM 702 to issue individual authorizations on its behalf to some or all of the users. Relevant authorization criteria may also be included in the authorization information 710.

The regulator 704 may also send to the SSM 702 spectrum usage information 712 that the SSM may need to perform its task. For example, the spectrum usage information 712 may include spectrum use in adjacent bands or adjacent geographical areas managed by the SSM 702 or non-confidential incumbent spectrum use information. The spectrum usage information 712 may be complemented by or may include protection criteria of adjacent band and/or adjacent geographical area usage. The SSM 702 may store the information received from the regulator 704 in a user and technology database(s) 714. The SSM 702 may send a confirmation message 716 to the regulator 704 to confirm the reception of the information and store it in its user and technology database. The SSM 702 may start operation in accordance with the received information from the regulator 704.

As part of the administrative update part 732, the regulator 704 may send to the SSM 702 an update of administrative information 718, which may include, but is not limited to, information related to the policy, issued authorizations, and/or relevant spectrum use. The SSM 702 may send confirmation 722 of the reception of the information, and may store the received information in its user and technology database 720. The SSM 702 may continue to operate in accordance with the updated guidance information from the regulator 704.

As part of the SSM reporting part 734, the SSM 702 may report activities and/or issued authorizations 724 to the regulator 704, including reporting about the assignments, occurrences of interference, and spectrum utilization and/or efficiency in accordance with the policy provided by the regulator 704. The reporting 724 by the SSM 702 may be periodic. The regulator 704 may accordingly store updated information in its database 726 and may send confirmation 728 to the SSM 702.

According to an embodiment, T2U and T3U admission control methods may be used by which the users may be authorized by the regulator to use spectrum through the SSM, and by which the SSM may perform admission control when allowing new T2Us and/or T3Us to register and later obtain spectrum assignments.

Admission control may be an important part in ensuring that the radio environment is predictable and under the control of the SSM. The predictability may facilitate the avoidance of harmful interference. The admission control may be applied to T2Us and/or T3Us, and may include, but is not limited to, any of the following: authorizations, registrations, and/or spectrum assignments. The admission control may depend on the policy issued by the regulator addressing the eligibility of particular entities getting authorization to access spectrum by using the services of the SSM. The admission control may depend on the availability of spectrum to fulfill the spectrum requirements of the T2U.

T3U admission control may depend on the authorization and/or sufficiency of spectrum, but may also depend on operating conditions of T2U(s). For example, if a T2U is close to its QoO limit, then a new T3U may not be admitted. Similarly, a T3U may be allowed if the nearby T2U is experiencing acceptable QoO. Being close to the QoO limit may indicate, for example, that the capacity of the network is approaching the maximum that can be accommodated into the assigned spectrum, and/or that the interference level is increasing and approaching the maximum level. Admission control for T3Us for areas adjacent to affected T2Us is described below.

Depending on the policy, individual authorization from the regulator may allow use of the services of the SSM. This may apply to the T2Us. For example, certain Mobile Network Operators (MNOs) may be eligible to use the services of the SSM if those MNO's would be individually authorized by the regulator. In the case the T2U may have received an individual authorization from the regulator before the registration to the SSM, it may provide an authorization key (e.g. provided by the administration) to the SSM during the registration process as a proof of the valid authorization and inform the SSM about the time validity of the authorization.

Figure 8:
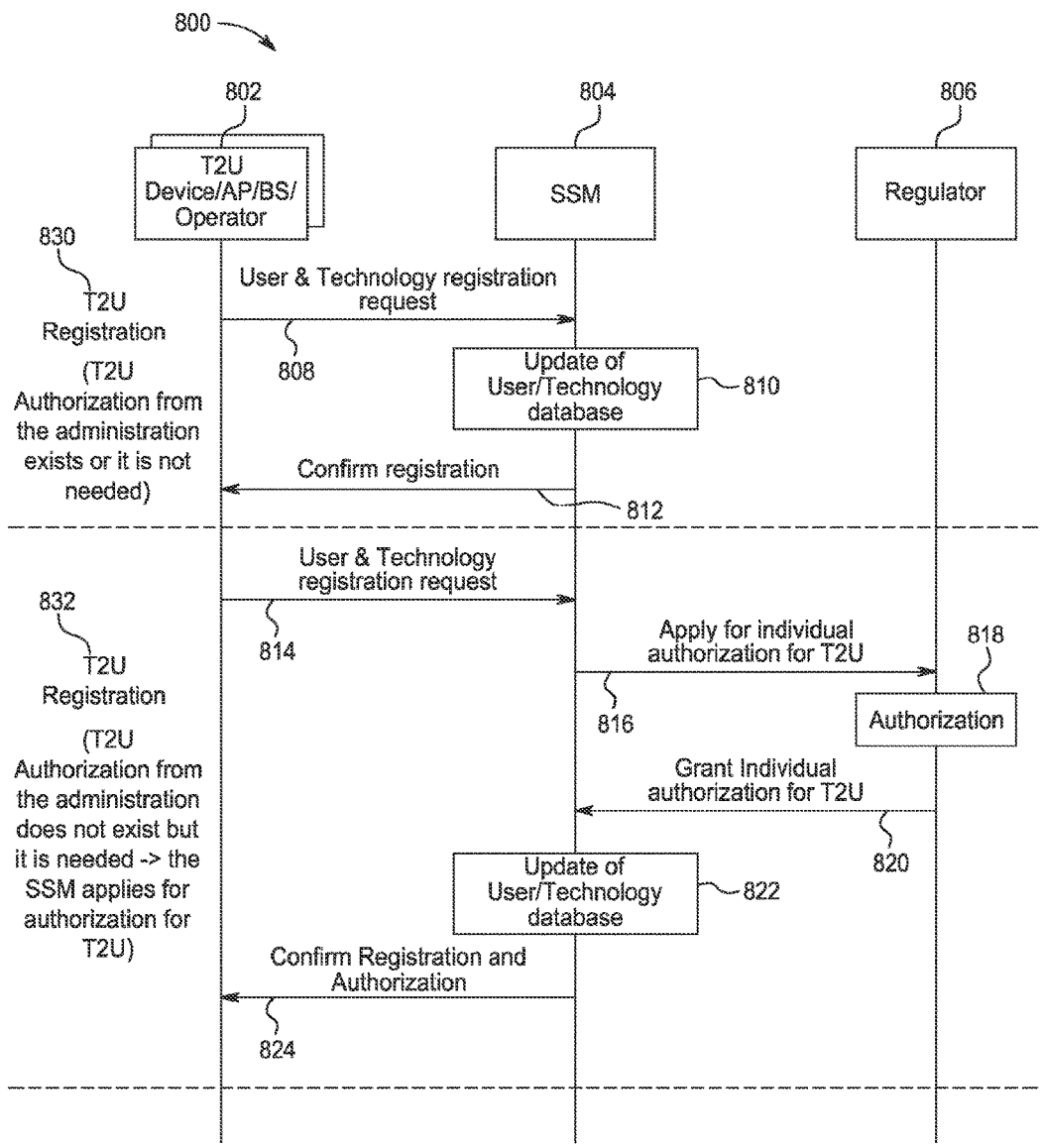
FIG. 8 shows a signal flow diagram of an example T2U registration procedure.

FIG. 8 shows a signal flow diagram of an example T2U registration procedure 800, where the SSM 804 may apply for individual authorization with the regulator 806 on behalf of the T2U 802. In a first example of a T2U registration process 830, T2U authorization from the administration may exist or may not be needed. Accordingly, the SSM 804 may receive a user and technology registration request 808 from the T2U 802 to collect information from the T2U 802 in order to be able to apply for the authorization. The user and technology registration request 808 may include, but is not limited to: the category and/or identity of the T2U, the technology to be deployed, a description of services to be provided, protection criteria, intended time frame of operation, and/or the operational area (e.g. geographical coverage). The SSM 804 may update its user and/or technology database 810, and may send a confirm registration message 812 to the T2U 802.

In a second example of a T2U registration process 832, T2U authorization from the administration may not exist but may be needed. In this case, the SSM 804 may apply for authorization for the T2U 802.

The SSM 804 may receive a user and technology registration request 814 from the T2U 802 to collect information from the T2U 802 in order to be able to apply for the authorization. The user and technology registration request 814 may include, but is not limited to: the category and/or identity of the T2U, the technology to be deployed, a description of services to be provided, protection criteria, a time duration, device classes, and/or the operational area (e.g. geographical coverage). The SSM 804 may apply for the individual authorization for the T2U 802 to the regulator 806 via an authorization request message 816. The regulator 806 may process the authorization 818, and may send a grant message 820 to the SSM 804 to grant individual authorization to the T2U 802. The SSM 804 may update its user and/or technology database 822 accordingly, and may send a confirm registration and authorization message 824 to the T2U 802.

According to an embodiment, an SSM may be authorized to issue individual authorizations to the T2U on behalf of the regulator. In this case, the SSM may need the applicable criteria for issuing the authorizations, which may be delivered to the SSM as part of the administrative phase. Applicable criteria may be based on the nature of the applicant. For example, for a T2U being a licensed MNO, a hospital, or a university deploying a network, the criteria may include the geographical location, deployed technology and/or a combination of several criteria.

Some T2Us may not need an individual authorization, such that the successful assignment by the SSM may be considered as the authorization depending on the policy. For example, the policy may allow use of certain technologies without individual authorizations.

The similar mechanisms as those described above may be used for authorizing T3Us. However, T3Us may operate under general authorization, such that no individual authorization or license may be needed. Additionally, pre-defined criteria may need to be met.

The issuance of authorizations may include any of the following approaches. According to an approach, all users that have been individually authorized by the regulator may be allowed to register and may be entitled to spectrum assignments. A mechanism such as an authorization key may be employed for the authorized users to indicate to the SSM in a reliable manner that they have the required authorization.

According to another approach, the SSM may be allowed to contact the regulator on behalf of the users, and may get the authorizations based on the identity, spectrum requirements, and/or technical characteristics of the users. Secure communication may be used for any or all of the communications between the SSM and the regulator. The regulator may issue the individual authorizations, which may include the validity time and/or possible operational conditions.

According to another approach, the SSM may be authorized by the regulator to authorize the users. For example, this may be done based on predefined criteria in line with a policy from the regulator. In case there is no need for individual authorizations, the SSM may allow any user to register and get assignments, or the SSM may choose the users that may get registered based on a policy issued by the regulator or other criteria. The individual authorization may be renewed when the current authorization expires, or if there are technical, operational and/or commercial changes that are specified in the policy.

According to an embodiment, the registration phase may allow the registration of authorized T1Us, T2Us and T3Us and the main technical characteristics of the technologies they employ. A unique user ID may be issued as part of the registration to each user by the SSM. The SSM may inform the users about the validity times of the registrations.

For example, the validity time of the registrations may be defined in the policy, or may be initially determined by the SSM. The registration may be renewed when its validity time expires, of in the event of technical, operational and/or commercial changes that may be specified in the policy.

According to an embodiment, the registration may be valid for a certain maximum time, and may expire if the user may not make any spectrum available or request for any assignment during the validity time of the registration. In this approach, the registration period may be automatically extended due to the activity of the user. Registration of characteristics of T3U technology may be used to ensure the protection of the T1Us and T2Us, unless the T3Us are using a technology which may be represented by generic characteristics for the protection calculations. This may be the case if, for example, a single technology or few essentially similar technologies may be used by the T3Us, such as WiFi APs.

While a separate registration phase may be used, according to another approach the registration and the initial spectrum offer and/or request may be performed in a single step. The amount of control traffic may be reduced if the technical characteristics are communicated within the registration phase and not within the spectrum offers and/or requests.

The SSM may use the registration phase as part of the admission control and may accept registrations based on any of the following: authorizations, technical criteria, and/or operational criteria. For example, operation criteria may include advance spectrum requirement estimation, aiming to avoid overloading of the band. The SSM may estimate the average available spectrum based on the number of T1Us registered and some indication of the spectrum they are willing to give. The SSM may estimate the needed spectrum based on the number of T2Us currently registered. The SSM may also admit new T2Us only if there is no obvious risk that there will be a shortage of spectrum in the long run.

According to an embodiment, a T2U may be automatically associated with some limit of spectrum use that the T2U may be assigned by the regulator. Thus, when the T2U registers initially, the SSM may automatically associate some maximum amount of spectrum usage with that user based on what may be associated with in the policy. Such limitation may be communicated to the T2U at the registration, and it may be implemented within the assignments.

Mechanisms may protect the higher tier users from harmful interference from lower tier users, as described below. According to an embodiment, an enhanced contour based approach may be used. An enhanced contour based mechanism may protect the T1U from harmful interference from T2Us and T3Us and may protect a T2U from harmful interference from the T1U, other T2Us and T3Us. Protection may also be extended to the T3U from harmful interference.

The T1U protection contours may define the area dedicated for the operation of the T1U, surrounded by a protection zone, where the transmitters and receivers of T2U (with known technical characteristics) may not enter in order to avoid causing harmful interference to the T1U or receiving it from the T1U. The combined T1U/T2U protection contours may define the combined area dedicated for the operation of the T1U and T2U, including the protection zone, where the transmitters of T3U (with known transmit characteristics) may not enter in order to avoid creation of harmful interference to T1U and T2U. The contour may not have to be a protection contour (e.g. area where T3U may not enter), but it may be a coverage contour, an area where the transmitters of T3U may operate.

The contours may be calculated by the SSM based on the technical and/or deployment information on the protected use and on the "entering" use. The SSM may take into account the possible radio environment quality information collected from T2Us based on measurements and sensing. The contours may be used by the SSM in defining the T2U assignments individually or communicated to the T3U as a contour in response to a spectrum request. For example, the SSM may use the contour approach in defining the available spectrum and operational conditions for a T2U and communicate the remaining spectrum and its operational area for the T3Us. Such contours may be calculated taking into account the actual technical characteristics and deployment conditions of the concerned systems.

As the T1U spectrum use may be more or less time varying, the contours may be used in a time varying manner, and may be updated in a timely manner to reflect the changes in spectrum use, deployments, and/or technology characteristics. For this mechanism to be used, the SSM may need to define the validity time of the contours, and the users utilizing spectrum based on such contours may have to check the SSM if updated contours are available before the expiry. As the protected area may be different for different channels (e.g. sub-bands), separate contours may be defined for each of channel by the SSM.

Figure 9A:
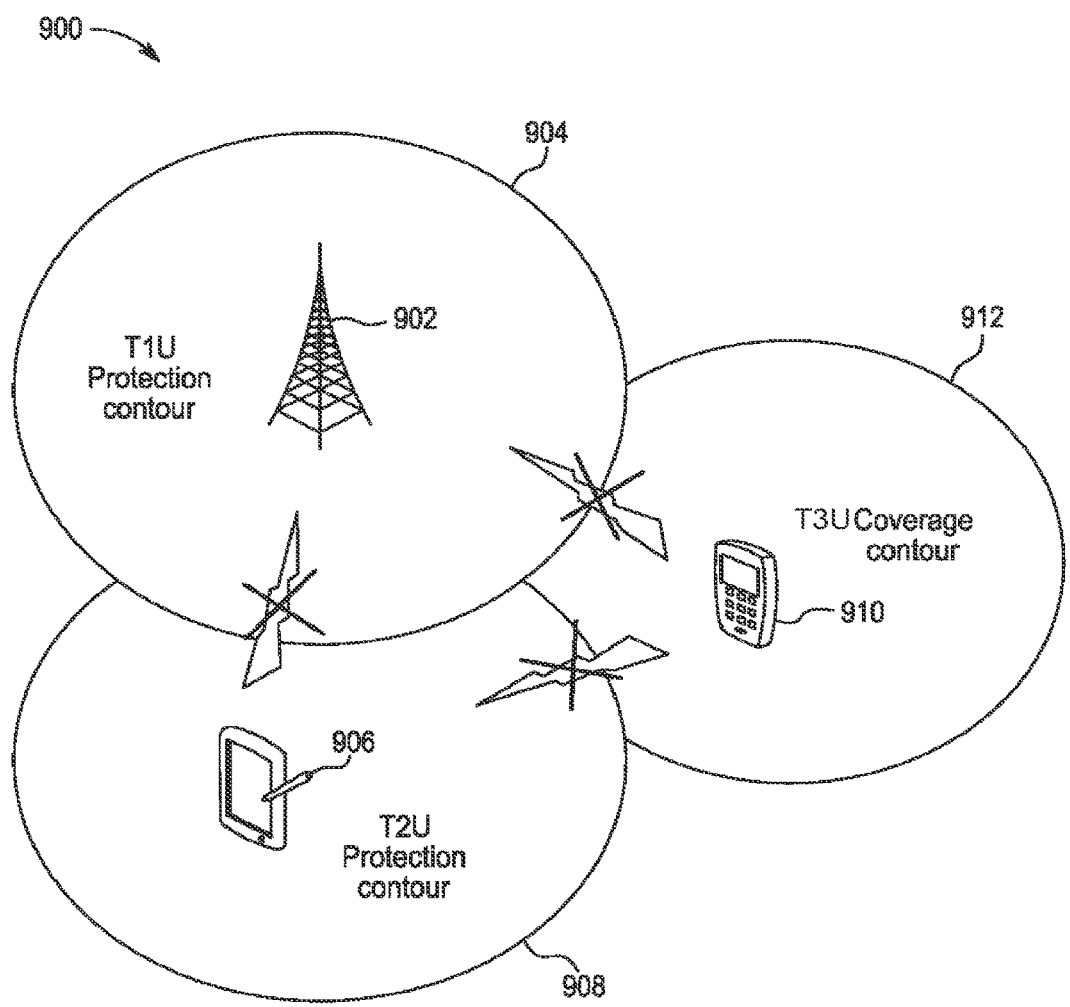
FIG. 9A shows a system diagram of an example of a shared spectrum access system with three tiers of access and protection contours.

FIG. 9A shows a system diagram of an example of a shared spectrum access system 900 with three tiers of access and protection contours. As shown in FIG. 9A, T1U 902 has a T1U protection contour 904, in which T2U 906 and T3U 910 may not operate. Similarly, T2U 906 has a protection contour 908 to protect it from harmful interference from other T2Us and lower tier users (e.g. T3Us). The coverage contour 912 for T3U 910 shows the area around T3U 910 where T3Us may operate. Note that the size and shape of protection contours may depend on many factors, including but not limited to: time, technology (e.g. LTE, WiFi), deployment characteristics (e.g. transmission power), topographical terrain information, and the specific channel.

Figure 9B:
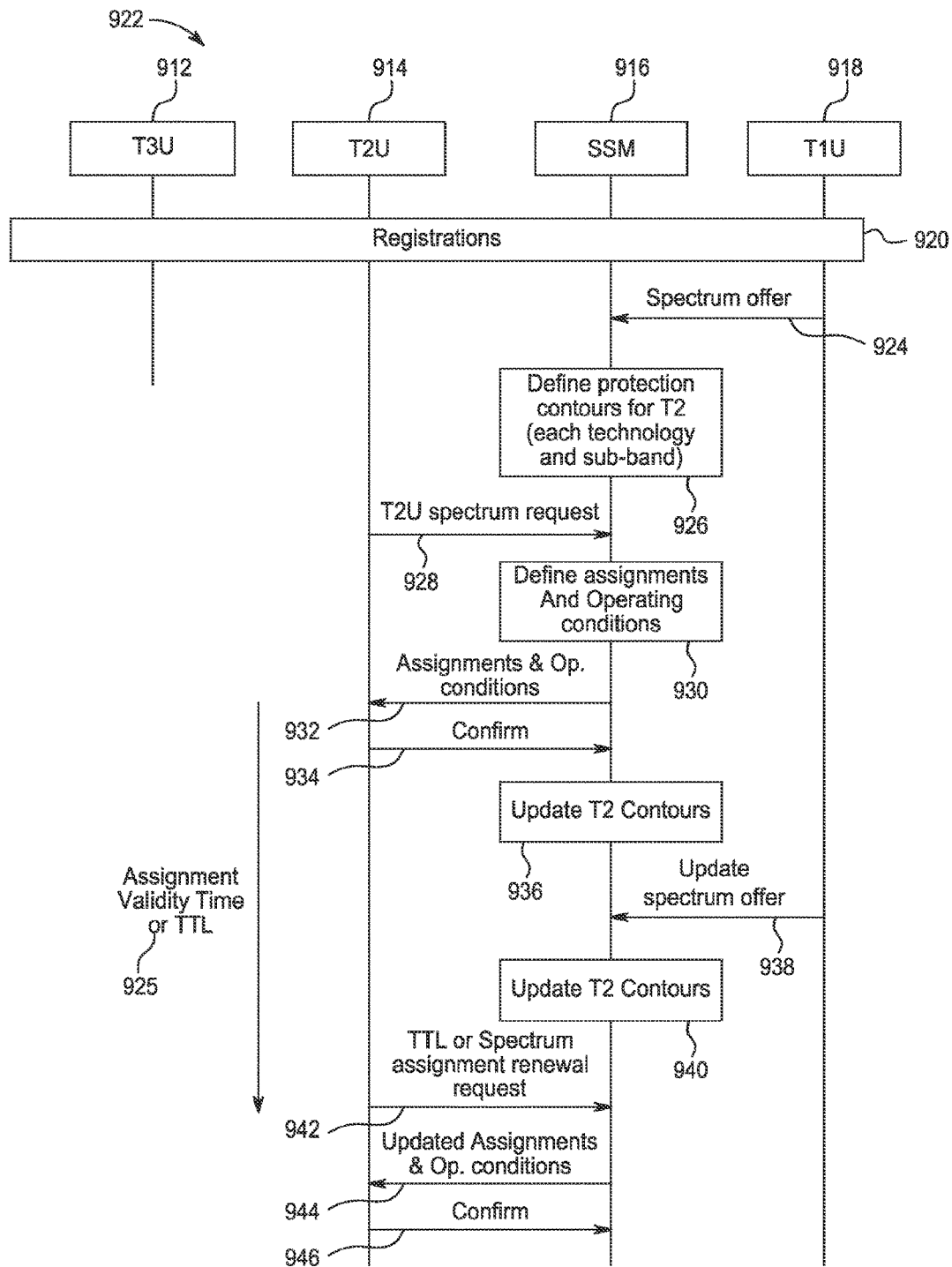
FIGS. 9B and 9C show signal flow diagrams of example T2U and T3U assignment procedures using protection contours.
Figure 9C:
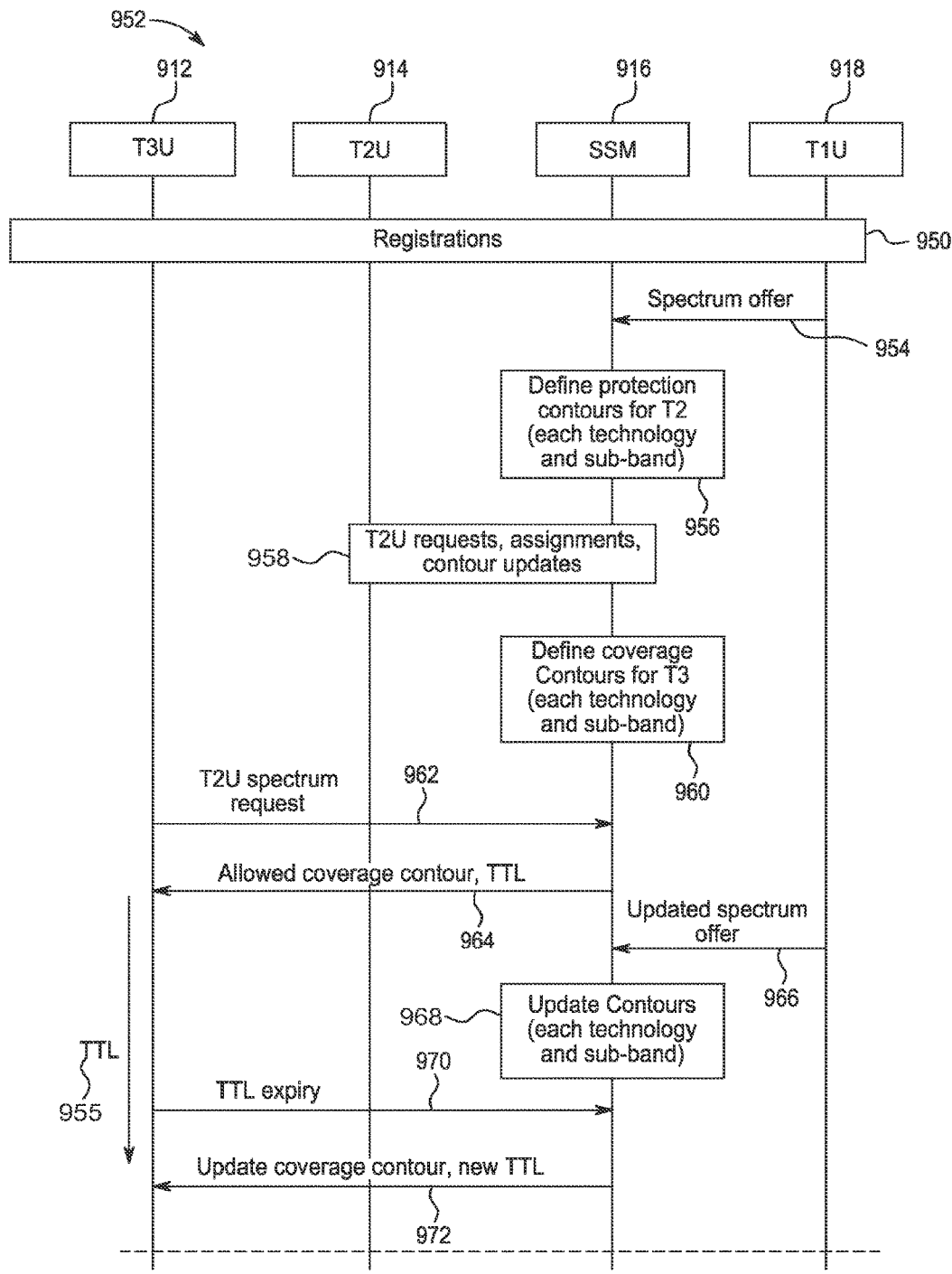

FIGS. 9B and 9C show signal flow diagrams of example T2U and T3U assignment procedures 922 and 952, respectively, using protection contours. The example assignment procedures 922 and 952 in FIGS. 9B and 9C involve T3U 912, T2U 914, SSM 916 and T1U 918.

According to the T2U assignment procedure 922 in FIG. 9B, following registrations 920, T1U 918 may send a spectrum offer 924 to the SSM 916, which may then define protection contours, 926, for T2U 914. These protection contours may be defined for each technology and/or sub-band. The T2U 914 may send a T2U spectrum request, 928, to the SSM 916, which may define assignments and operation conditions, 930, for the T2U 914. SSM 916 may send message 932 to the T2U 914 including the assignments and operation conditions, and the T2U 914 may send a confirmation message 934. The assignments may have a validity time or time-to-live (TTL), 925. The SSM 916 may update protection contours 936 for T2U 914 on an as-needed or periodic basis.

At any time, the T1U 918 may send an updated spectrum offer 938 to the SSM 916, which may accordingly update protection contours, 940, for T2U 914. By the expiration of the TTL 925, the T2U 914 may send a TTL or spectrum assignment renewal request, 942, to the SSM 916, which may reply with an updated assignments and operating conditions message, 944. The T2U 914 may send a confirmation message 946 back to the SSM 916.

According to the T3U assignment procedure 952 in FIG. 9C, following registrations 950, T1U 918 may send a spectrum offer 954 to the SSM 916, which may then define protection contours, 956, for T2U 914. These protection contours may be defined for each technology and/or sub-band. The T2U 914 may send T2U spectrum requests, assignments and/or contour updates, 958, to the SSM 916, which may define coverage contours for T3Us, 960, such as T3U 912.

The T3U 912 may send a T3U spectrum request message 962 to the SSM 916, which may respond with message 964 including the allowed coverage contour and/or TTL for T3U 912. The allowed cover contour may have a validity time or TTL, 955. At any time, the T1U 918 may send an updated spectrum offer 966 to the SSM 916, which may accordingly update protection and/or coverage contours, 968. By the expiration of the TTL 955, the T3U 912 may send a TTL expiry message, 970, to the SSM 916, which may reply with a coverage contour and/or TTL, 972, for T3U 912.

The protection contour approach may facilitate QoA for T1Us and T2Us. By adding the time variance and taking into account the actual device characteristics, the overall efficiency of such shared spectrum use may be much higher than in other TVWS approaches. Furthermore, in the case in which the contours are used, the algorithms may be simpler than in the case that each transmitter and receiver may be considered at their locations as is the case with pixel based approaches.

According to an embodiment, radio quality maps may be maintained at the SSM. A pixel-based geometry may allow definition of transmission power for individual transmitters and protection of individual receivers from harmful interference in a time variant radio environment. The SSM may take into account the technical and deployment characteristics of the users, complemented by results of measurements conducted by the users. Such a location based approach may ensure protection of T1Us and T2Us from harmful interference while maximizing the allowed transmission powers. A pixel based approach may be defined for the TVWS use in Europe to protect terrestrial broadcasting and possibly wireless microphones in some countries. However, protection and coordination among the White Space Devices (WSDs) to avoid mutual interference may be lacking. WSDs may not send measurement results about the radio environment to the Geolocation Database (GLDB). Alternatively, the GLDB may be used with WSDs employing the TVWS, and the SSM may assign spectrum individually to the T2Us employing the unused portions of the spectrum of the T1Us to avoid causing harmful interference to each other. User protection from harmful interference may take into account the actual interference situation.

According to an embodiment, measurements performed by users may be combined with the pixel based assignment approach by the SSM. For example, the users may measure the noise level in different pixels, and the SSM may collect and combine them into a radio quality map. The map may be used when the SSM assigns spectrum to users that require the QoA and may take into account other factors including, but not limited to: the possible transmit powers, required signal-to-noise ratios, and/or deployment. According to another embodiment, a master device of a T2U system may send periodic measurement results to the SSM that reflect the noise levels as experienced by the T2U across its network coverage. Examples of master devices include, but or not limited to a small cell eNB for an LTE based system, or an AP for a Wi-Fi based system.

According to another embodiment, QoO maps may be maintained at the SSM. Measurements may be applied to QoO maps. For example, a master device of a T2U system may send periodic measurements to the SSM that reflect the effective QoO as experienced by the T2U. The SSM may maintain a map of the effective QoO for any or all T2Us with active frequency assignments such that the map may be associated with the protection contours or the pixel based approach. The QoO maps may be categorized based on the effective QoO.

For example, different colors such as red, yellow and green may represent different categories of QoO level. If the effective QoO reported by a T2U is below the minimum QoO target for that user, then the target QoS and/or QoO is not being met. In this case, the corresponding coverage contour may be assigned the "red" color. When the effective QoO is above the minimum target, but less than x % above the minimum target, the corresponding contour may be assigned the "yellow" color. When the effective QoO is more than x % above the minimum target, the corresponding contour may be assigned the "green" color. The map coloring scheme may be used in conjunction with the admission control, and/or the time to live (TTL) signaling as described below, in order to control the QoO of T2U.

The SSM may maintain a QoO Map based on the periodic measurement reports from T2U master devices (MDs). Examples of MDs include a small cell eNB in the case of LTe and an AP in the case of Wi-Fi. When the T3U is operating adjacent to a T2U with QoO close to the minimum required level, the SSM may not assign and/or may not renew TTL spectrum to T3U. When the adjacent T2U's QoO is in the green zone (e.g. it meets required QoO with some margin above the minimum), the T3U may be assigned spectrum and/or its TTL may be renewed. When the SSM assigns spectrum to a T3U and the QoO of the adjacent T2U falls below a threshold, the T2U may report a QoA event. Consequently, the SSM may use first in, first out (FIFO) or last in, first out (LIFO) to deny TTL renewal to T3Us in the area. The SSM may not renew TTLs for T3Us in the areas adjacent to affected T2U.

According to an example procedure of a QoA event related to measurements, the SSM may assign spectrum for the T2U based on its request and success in the auction (if in use). The assignment may fulfill the QoA needed by the T2U if the assigned spectrum is sufficient and protected from harmful interference.

The T2U may start operation in the assigned spectrum and may monitor its own QoO by measuring the channel performance and/or monitoring the quality of the assigned spectrum. The T2U may send the QoO measurement results periodically to the SSM. The T2U may send the QoO measurement results based on triggers. In case QoO degradation may be detected in the assigned spectrum in use, the T2U may send a QoA Event message to the SSM. The SSM may reassign spectrum for the T2U. This may involve changes in the spectrum use of other T2Us and/or T3Us, and the reassignment may take into account measurements from other users.

When the QoA event is due to interference from a T3U to a T2U, the SSM may perform admission control for the T3U for areas adjacent to the affected T2U. In this case, the SSM may maintain a QoO map based on the periodic measurement reports from T2U MDs. When the T3U is adjacent to the T2U with yellow QoO, the SSM may not assign spectrum and/or renew the TTL to the T3U. When the adjacent T2U is green and meets required QoO within a margin, the T3U may be assigned spectrum and/or have its TTL renewed. When the SSM assigns spectrum to a T3U, then an adjacent T2U MD may report a QoA event and may use FIFO or LIFO to deny TTL renewal to T3Us in the area. The SSM may perform no TTL renewal for T3U in areas adjacent to affected T2U.

According to an embodiment, a channel management function (CMF) enhancement may be used for QoA event detection. CMF may comprise a software entity residing in an AP that may perform functions including, but not limited to, managing, selecting channels, and/or monitoring channel status. A CMF may also make requests to the SSM for spectrum.

Figure 10:
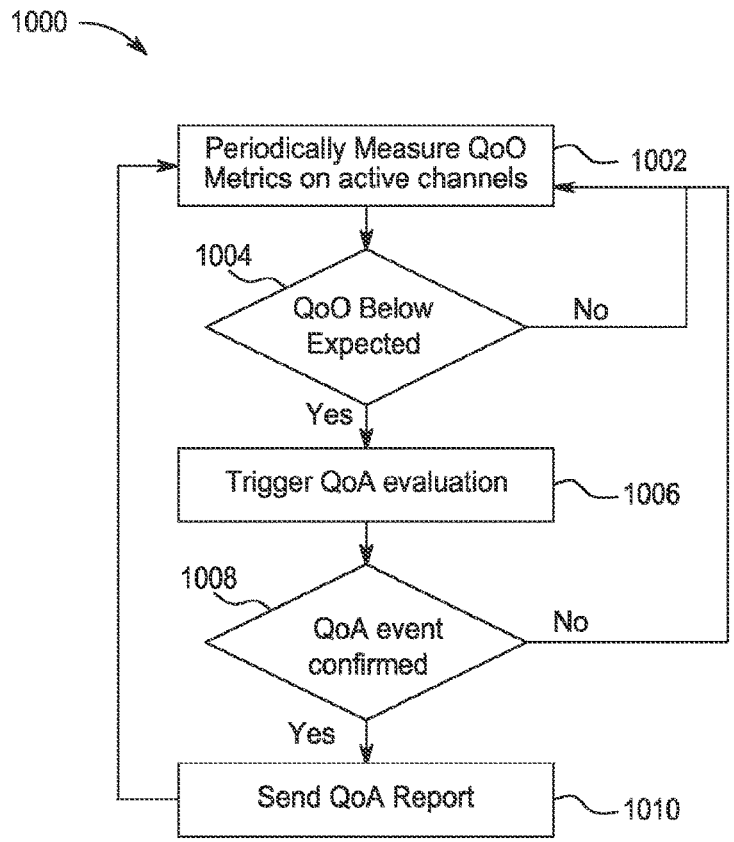
FIG. 10 shows a flow diagram of an example QoA event detection procedure.

FIG. 10 shows a flow diagram of an example QoA event detection procedure 1000. The QoA event detection procedure 1000 may be performed by a WiFi AP, for example. A WiFi AP may periodically measure QoO metrics on active channels, 1002. Such measurements may include, but are not limited to, the per WTRU received signal strength indication (RSSI), the transmission rate (TxRate), medium access delay, and/or sensing of alternate channels such as with a sensing toolbox. The AP may calculate an expected QoO based on its noise measurements, 1004. When the performance of the link falls below an expected QoO, 1004, the WTRU may trigger some extended measurements to evaluate the QoA, 1006. Otherwise, the AP may return to periodic measurements of QoO, 1002. When a QoA event is confirmed, 1008, the AP may send a QoA report or event message to the SSM, 1010. Otherwise, the AP may return to periodic measurements of QoO, 1002.

According to another embodiment, leakage power may be measured. The use of measurements on leakage power into the analog front end of a T2U may be used to indicate a problematic assignment by the SSM. For example, when a transmitter and a receiver communicate on one channel, there may be a leakage signal from adjacent channel(s) into the active channel. When a WTRU or station has adjacent channel leakage power constantly higher than its Clear Channel Assessment (CCA) threshold, the CCA process may always assess its active channel as busy. That station may not send out data and may always stay in back off status. When a T2U is falling into this situation, it may perform a sensing procedure to specify the adjacent channel leakage power and detect the source leakages into its analog front-end.

When an AP or WTRU always senses its active channel as busy and the AP cannot send out or receive any data from WTRU, the AP may start performing sensing over its active channel. If the AP experiences interference higher than the CCA threshold without receiving any data from the WTRU, it may assume there is interference leakage from the adjacent channel(s). That may be concluded because during a silencing period of the AP's basic service set (BSS) over the active channel there may be no data coming in and or moving out from the AP and all BSSs may be on back off status.

Sensing on the adjacent channels (on both sides of the active channel) may be used to try to determine some correlation between the power in the adjacent channel and the leakage into the active channel. AP or WTRU may deploy a suitable filter to tune to the left side adjacent channel and/or right side adjacent channel and may measure the signal power received per each channel. The measurement on the active channel during the BSS silencing period may indicate the leakage interference power. The adjacent channel, which may have the signal power with the same correlation with signal power measured at the active channel, may be the cause of the issue. Furthermore, it may be possible to detect the technology used in the interfering transmissions.

Figure 11:
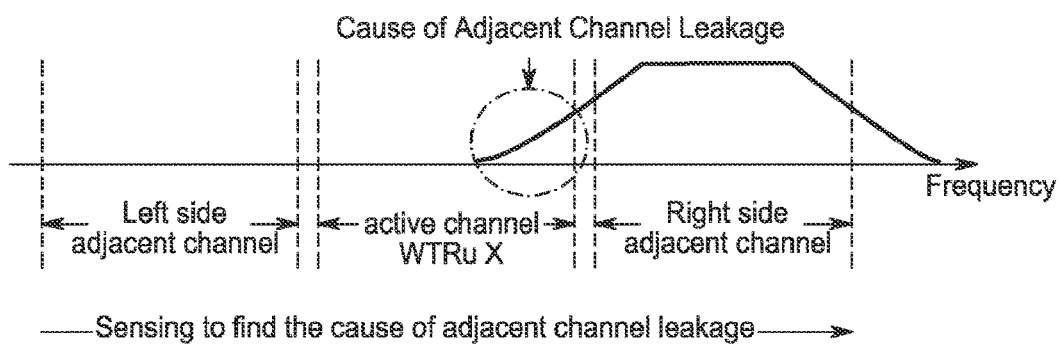
FIG. 11 shows a frequency diagram of an example use of a band pass filter to detect the cause of adjacent channel leakage.

FIG. 11 shows a frequency diagram of an example use of a band pass filter to detect the cause of adjacent channel leakage. Sensing is performed along the adjacent and active channel frequencies to detect leakage. In the example scenario of FIG. 11, the right side adjacent channel may be detected as the cause of the adjacent channel leakage, which may occur at WTRU X.

To improve the accuracy of the detection, WTRU X may deploy two separate channel leakage measurements over its active channel: left side measurement and right side measurement. The filter may be configured to narrow down to half of the channel bandwidth. The measurements may find out the leakage signal power at the left side and at the right side of the active channel. The AP or WTRU then may compare these measurements with the received signal power at the left side adjacent channel and right side adjacent channel. The cause of adjacent channel leakage may be from the side with higher leakage signal power at the active channel, and this leakage signal power may have the same correlation with signal reception at the adjacent channel on the same side. This approach may also detect the scenario when adjacent channel leakage is coming from both sides.

According to another embodiment, when the AP or WTRU detects the adjacent channel leakage, the AP may report it to the SSM as a leakage event. The SSM may send a request to the WTRU and/or AP that operate on the adjacent channels in the same geographical area to schedule a silencing gap and send the results back to the SSM. By analyzing the correlation between the signal power at the active channel and adjacent channel, AP X during the silencing gap duration may find the cause of the leakage and report it to SSM to solve the issue. The SSM may send the request to the system operating on the adjacent channel to lower its transmit power level to avoid the leakage of harmful interference or the SSM may reassign the BSS operating on to active channel to a different channel with higher quality, for example.

Figure 12:
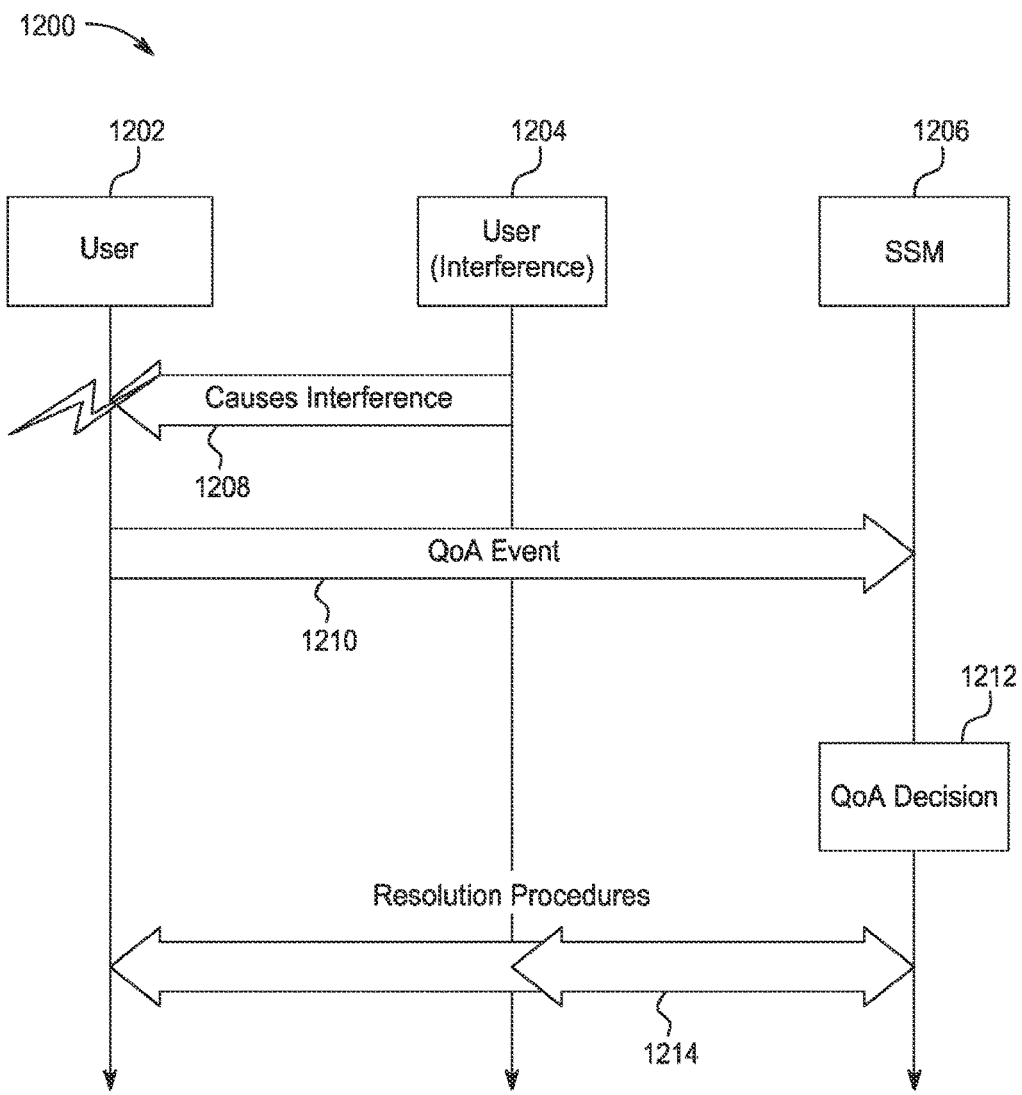
FIG. 12 shows a system diagram of an example QoA event resolution procedure.

According to an embodiment, a QoA event resolution procedure may be used by the SSM to resolve a QoA event. FIG. 12 shows a system diagram of an example QoA event resolution procedure 1200. The QoA event resolution procedure 1200 occurs between user 1202, interfering user 1204, and the SSM 1206. Interference 1208 caused by user 1204 toward user 1202 triggers user 1202 to send a QoA event message 1210 to the SSM 1206, which in turn triggers a QoA decision 1212 at the SSM 1205 and resolution procedures 1214 between users 1202, 1204 and the SSM 1206.

When an SSM receives a QoA event from a user, it may be responsible to resolve the QoA issue. The SSM may have an algorithm to decide between any of the following actions: assign a new channel, or evacuate interfering users. According to the former action, the SSM may assign a new channel to the user who issued the QoA event. The SSM may check the spectrum usage database and find a new channel that can provide the required level of QoA to the user.

According to the latter, action the SSM may evacuate nearby users of the spectrum to resolve the interference to the user who issued the QoA event. The SSM may send an evacuation message to the interfering user to vacate some channels. An interfering user may send a confirmation that it has vacated the channel(s). If the interfering user fails to send a confirmation message, then the SSM may assign a new channel to the user that issued the QoA event, deny a renewal request for another user, and/or issue a reimbursement to the user that issued the QoA event.

If the evacuation did not resolve the QoA issue, then the user that issued the QoA event may send another QoA event message indicating that the problem was not solved. The SSM may then further evacuate channels of nearby users until the QoA issue is resolved. If after a number of attempts the SSM fails to resolve the QoA issue then the SSM may issue a reimbursement.

To determine if a user is nearby, the SSM may search the usage database for any users operating within a radius R who may be operating on the same band as the Tier 2 user who sent the QoA event. For example, this radius may be a function of the maximum power level allowed on the channel, the propagation characteristics of the frequency, and/or transmit power mask. According to another embodiment for evacuating a user, the SSM may issue a shortage of spectrum notice which may include a reimbursement as per the QoA agreement.

According to an embodiment, control signaling may be used to manage the time aspect of spectrum assignments. The concept of TTL may be used to allow for time-limits and renewals to spectrum reservations, and to allow the database to contact the secondary device and immediately rescind its authorization to use the spectrum. This implies that the TTL may be used to ensure the time validity of the protection of the incumbent users (e.g. T1U) from harmful interference from the lower tier users.

The TTL concept may be extended so that TTL signaling may be used by the T3Us, and TTL signaling may be used in connection with evacuation signals to T2Us in the case the spectrum has to be released. Procedures may be used by the SSM in conjunction with the TTL concept used by a T3U to maintain the required QoA of T2Us in case reassignments may be needed.

The TTL may be set depending on the type of spectrum being shared and/or on the type of user sharing the spectrum. The TTLs of the T3Us may need to be relatively short to facilitate fast response to spectrum reassignments, whereas the T2Us that require QoA and may benefit from longer TTL in certain cases. The TTLs may be the same or different among the T3Us and the same or different among the T2Us, and may depend on the source of the spectrum, for example on the T1U and the nature of its spectrum use. Some spectrum may have a longer TTL because the advance notice with which the T1U may need the spectrum back can be longer.

A framework for TTL timers and signaling is described below. According a "heartbeat" approach, the SSM may periodically send a TTL renewal signal if the spectrum use can continue. According to another approach, the user may contact the SSM to ask for a TTL renewal.

Figure 13:
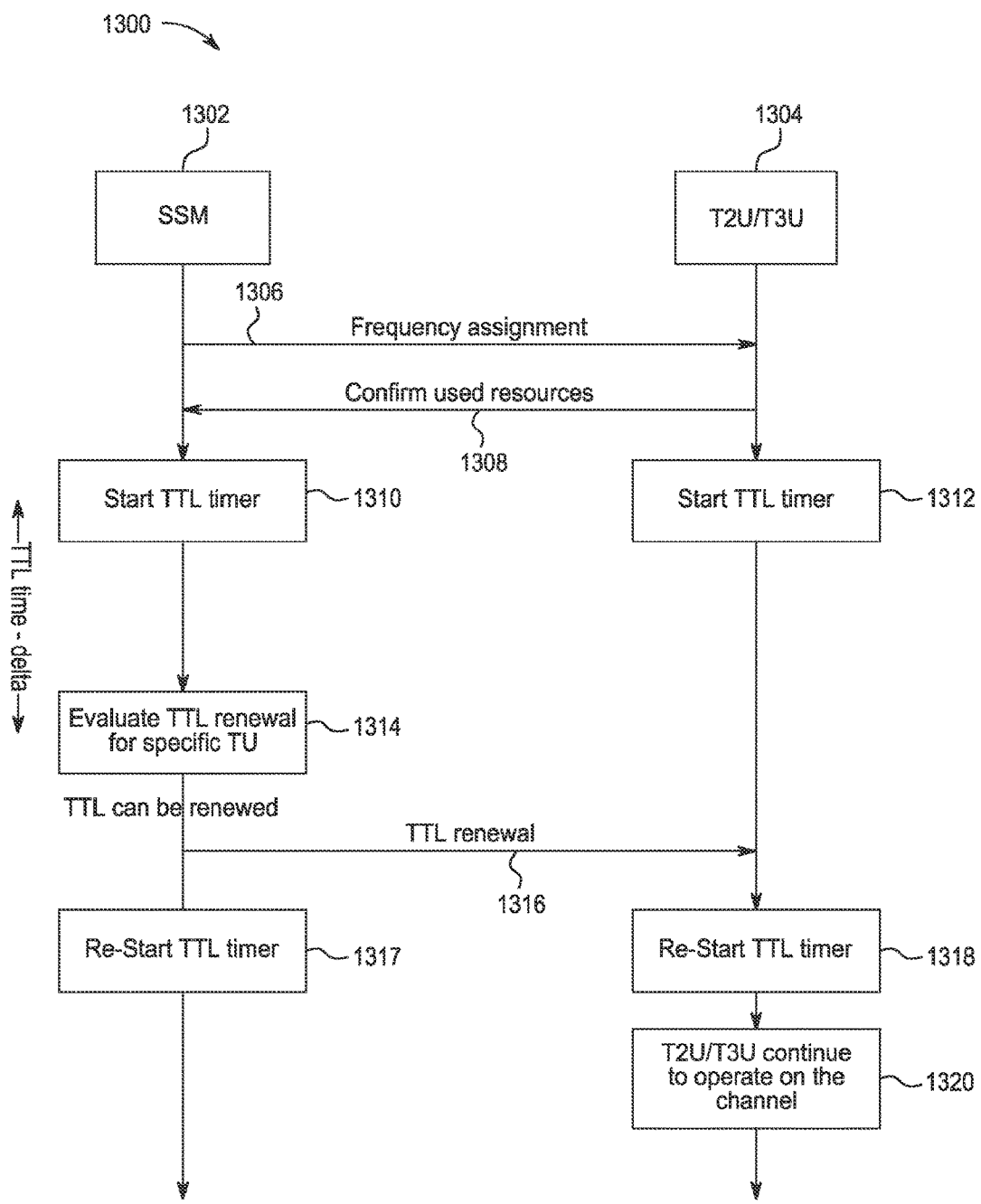
FIG. 13 shows a signal flow diagram of an example TTL renewal procedure for a T2U/T3U in communication with an SSM.

According to an embodiment, a TTL renewal procedure is such that the TTL renewal signal acts as a heartbeat for T2Us and/or T3Us. FIG. 13 shows a signal flow diagram of an example TTL renewal procedure 1300 for a T2U/T3U 1304 in communication with an SSM 1302.

The SSM 1302 may send a frequency assignment message 1306 to the T2U/T3U 1304, such that the frequency assignment message 1306 may contain the TTL to limit the amount of signaling associated with TTL.

Once the T2U/T3U 1304 confirms the used resources via message 1308 and the frequency assignment becomes effective, the SSM 1302 and the T2U/T3U 1304 may start TTL timers 1310 and 1312, respectively. Prior to the expiration of the TTL timer for a given T2U/T3U 1304, the SSM 1302 may perform the following actions.

At some delta of time prior to the TTL timer expiry, the SSM 1302 may evaluate if the TTL may be renewed, 1314, for the T2U/T3U 1304. For example, for a Tier 2 User, the SSM 1302 may check if the rental/lease time of the channel has expired, or if the Tier 1 user may reclaim the spectrum. When the SSM determines that the TTL of the user may be renewed, it may send a TTL renewal message 1316 to T2U/T3U 1304. The SSM 1302 and/or the T2U/T3U 1304 may restart the TTL timer 1317 and 1318, respectively, associated with the T2U/T3U 1304.

Once a T2U/T3U 1304 receives the TTL renewal message 1316, it may continue operating on the channel, 1320. For example, the T2U/T3U 1304 may operate for the same TTL duration or until an evacuation command if such message is received from the SSM 1302 before the TTL expiry.

Figure 14:
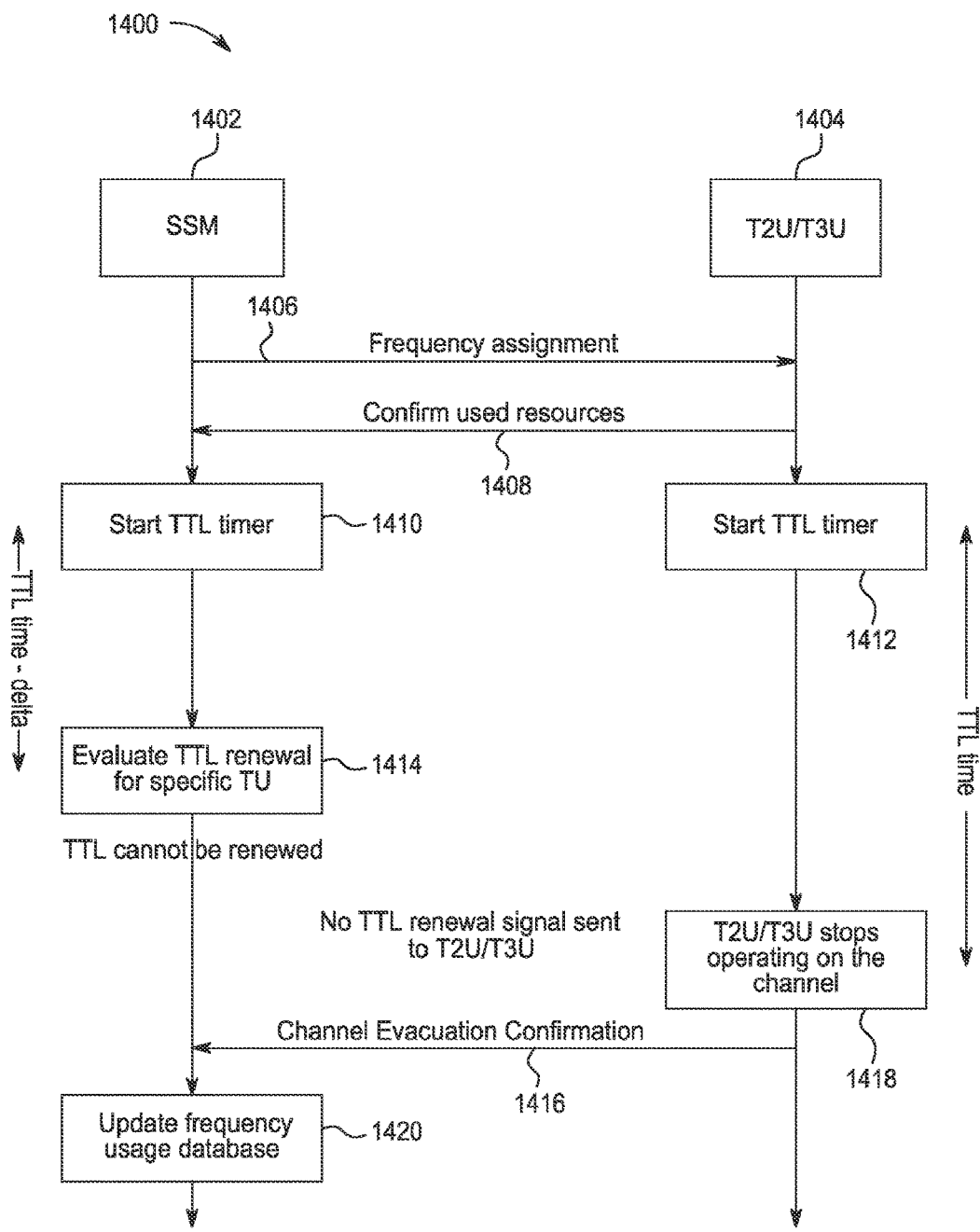
FIG. 14 shows a signal flow diagram of an example TTL renewal procedure for a T2U/T3U in communication with an SSM.

FIG. 14 shows a signal flow diagram of an example TTL renewal procedure 1400 for a T2U/T3U 1404 in communication with an SSM 1402.

The SSM 1402 may send a frequency assignment message 1406 to the T2U/T3U 1404, such that the frequency assignment message 1406 may contain the TTL to limit the amount of signaling associated with TTL. Once the T2U/T3U 1404 confirms the used resources via message 1408 and the frequency assignment becomes effective, the SSM 1402 and the T2U/T3U 1404 may start TTL timers 1410 and 1412, respectively. Prior to the expiration of the TTL timer for a given T2U/T3U 1404, the SSM 1402 may perform the following actions.

At some delta of time prior to the TTL timer expiry, the SSM 1402 may evaluate if the TTL may be renewed, 1414, for the T2U/T3U 1404. In this example, for a T3U 1404, the SSM 1402 may determine that the TTL cannot be renewed. This may happen, for example, when the frequency assignment algorithm running at the SSM 1402 determines that the T3U 1404 generates harmful interference to either protected T1 users, or to T2 users. In this case, the SSM may not send the TTL renewal signal to the T3U 1404.

When the T2U/T3U 1404 does not receive the TTL renewal signal from the SSM 1402 within a certain window from the TTL timer expiration, the T2U/T3U 1404 may cease any transmission and stop operating on the channel, 1418, and may start evacuation procedures. The T2U/T3U 1404 may send the an channel evacuation confirmation message 1416 to the SSM 1402, which may include the cause of evacuation such as TTL timer expired, or no TTL renewal message received, for example. Upon receiving the evacuation confirmation message 1416, the SSM 1402 may update the frequency usage database, 1420.

Figure 15:
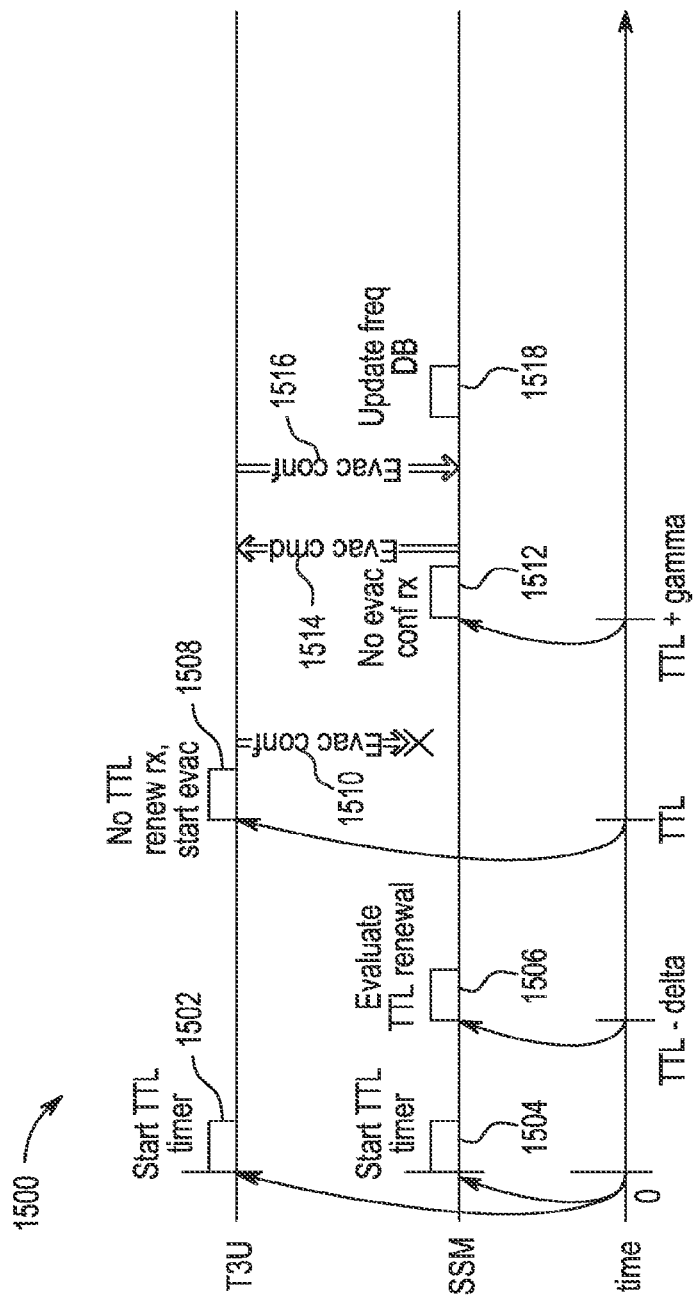
FIG. 15 shows a timing diagram of an example TTL renewal procedure with a missing evacuation confirmation.

FIG. 15 shows a timing diagram of an example TTL renewal procedure 1500 with a missing evacuation confirmation. At time 0, the SSM and T3U may start their TTL timers, 1502 and 1504, respectively. At some time TTL-delta prior to the expiry of TTL, the SSM may evaluate the TTL renewal, 1506. At time TTL, the T3U has not received a TTL renewal, 1508, and therefore may start an evacuation procedure, however, the evacuation confirmation may not be received at the SSM, 1510. In this case, at time TTL+gamma the SSM may determine that no evacuation confirmation was received, 1512, and may send an evacuation command, 1514, to the T3U that may in turn confirm the evacuation, 1516. The SSM may update the frequency database accordingly, 1518.

Figure 16:
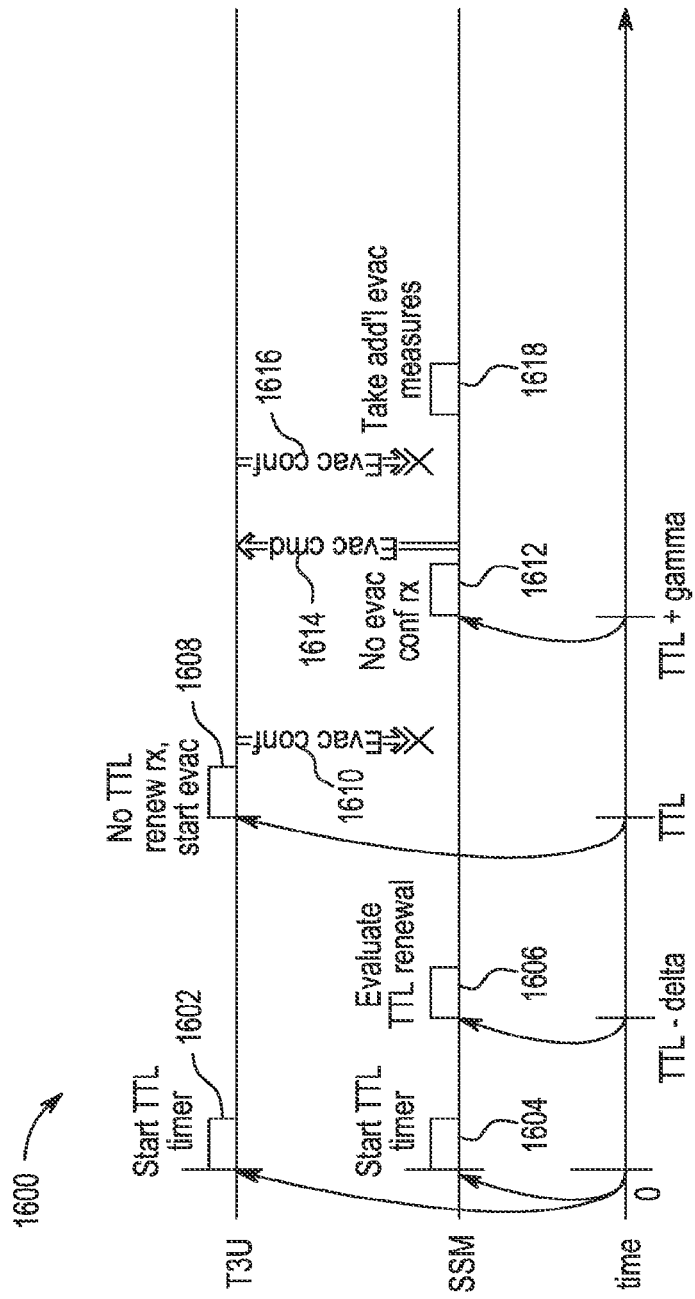
FIG. 16 shows a timing diagram of another example TTL renewal procedure with a missing evacuation confirmation.

FIG. 16 shows a timing diagram of another example TTL renewal procedure 1600 with a missing evacuation confirmation. At time 0, the SSM and T3U may start their TTL timers, 1602 and 1604, respectively. At some time TTL-delta prior to the expiry of TTL, the SSM may evaluate the TTL renewal, 1606. At time TTL, the T3U has not received a TTL renewal, 1608, and therefore may start an evacuation procedure, however, the evacuation confirmation may not be received at the SSM, 1610. In this case, at time TTL+gamma the SSM may determine that no evacuation confirmation was received, 1612, and may send an evacuation command, 1614, to the T3U that may in turn unsuccessfully attempt to confirm the evacuation, 1616. As a result, the SSM may take additional evacuation measures, 1618.

The TTL timer values may be signaled from the SSM to the T2U/T3U upon the frequency assignment. The values assigned to the TTL may depend on the type of spectrum and its usage by the T1U to enable evacuation of the channel within the time requirements imposed by the T1U that offers the spectrum for sharing.

For a given type of spectrum, the TTL associated with a T2U may be larger than the TTL associated with a T3U that may operate in the same frequency. By increasing the TTL of T2U, the signaling overhead for the TTL renew messages may be reduced. At the same time, a lower TTL for T3U may enable the SSM to control the usage of the channel in such a way that QoA may be provisioned for T2U, especially in cases where changes may be needed on a short notice for the assignments.

According to an embodiment, depending on the issued policy, the parts of spectrum that are left unused by the T2Us may be assigned to T3Us in a shared manner. According to example, T3Us may be allowed to use their spectrum in a shared manner without protection or coordination. They may ensure that there is no harmful interference towards the users in the higher tiers. T3Us may also use the spectrum for free.

The SSM may reserve a certain minimum bandwidth (e.g. 5 MHz or 25 MHz) for T3Us. This bandwidth may not be used as a buffer to accommodate the increased or changing T2U traffic, but may be available at any time for T3Us. This may ensure that there is always some bandwidth available for T3Us, regardless of the spectrum requirements of the T1Us and T2Us. In such a case, T3Us may be required to pay a fee for having guaranteed spectrum available, even though the spectrum use of the T3Us may not be coordinated or provided protection from harmful interference.

According to an embodiment, the SSM may coordinate the spectrum use of the T3Us, for example by spreading them evenly across the spectrum that is made available for them, and thus spreading also the possible interference evenly among the T3Us. This type of approach may facilitate provisioning of some QoA for the T3Us.

According to an embodiment, a T2U's spectrum requirements may change. The overall spectrum demand of the T2Us may change over time, for example the T2U may need more or less spectrum in certain locations, areas, or over the whole deployed network. The T2U spectrum demand may also change during the T2U assignment. Depending on the policy, the SSM may react and/or do reassignments.

Figure 17:
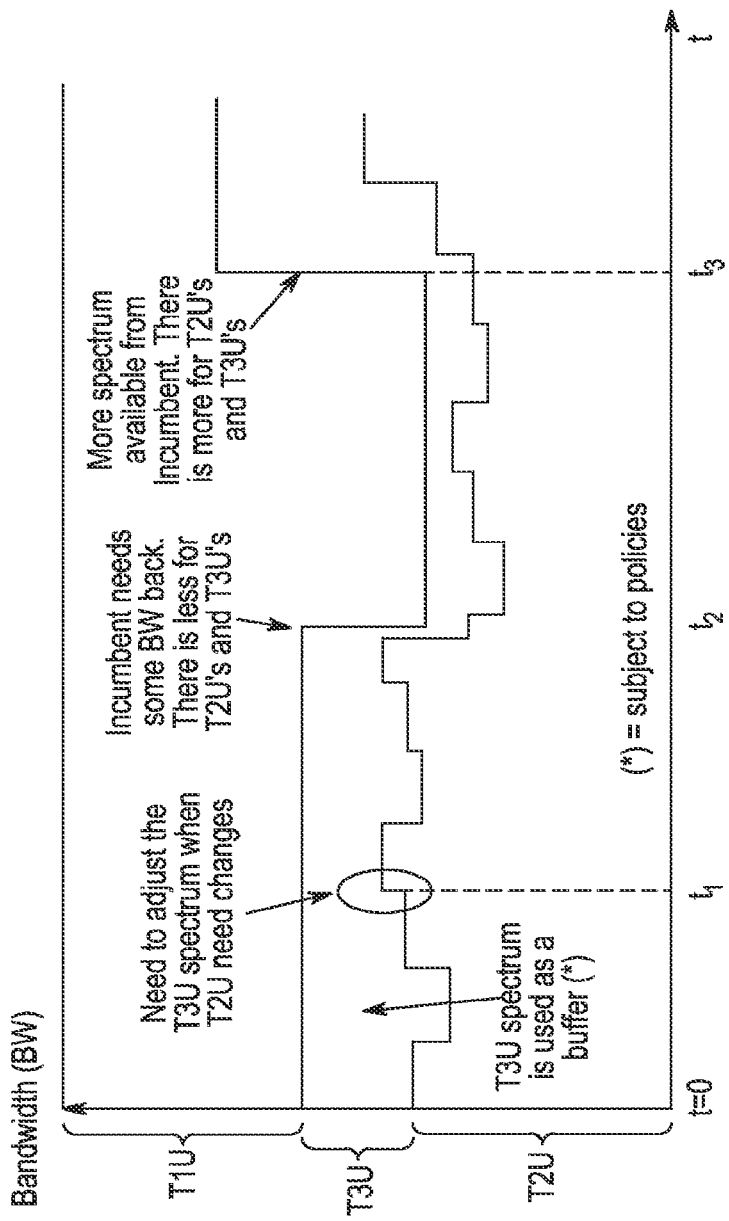
FIG. 17 shows an example 3-tiered spectrum model in a location where a tier 1 user (T1U) makes a certain amount of spectrum available for lower layers.

FIG. 17 shows an example 3-tiered spectrum model in a location where a tier 1 user (T1U) makes a certain amount of spectrum available for lower layers. As shown in FIG. 17, a change in the overall spectrum of the T2U occurs at time $t_1$, such that the T2U needs more spectrum. This change may cause a reduction in the spectrum of the T3U by the same amount, assuming that the spectrum for T3Us may be used as buffer for changes. At time $t_2$, the incumbent T1U may need some bandwidth (BW) back, which may come out of the bandwidth available for use by the T2U and/or the T3U. At time $t_3$, the incumbent T1U frees up some spectrum, and makes it available to the T2U and/or the T3U.

Figure 18:
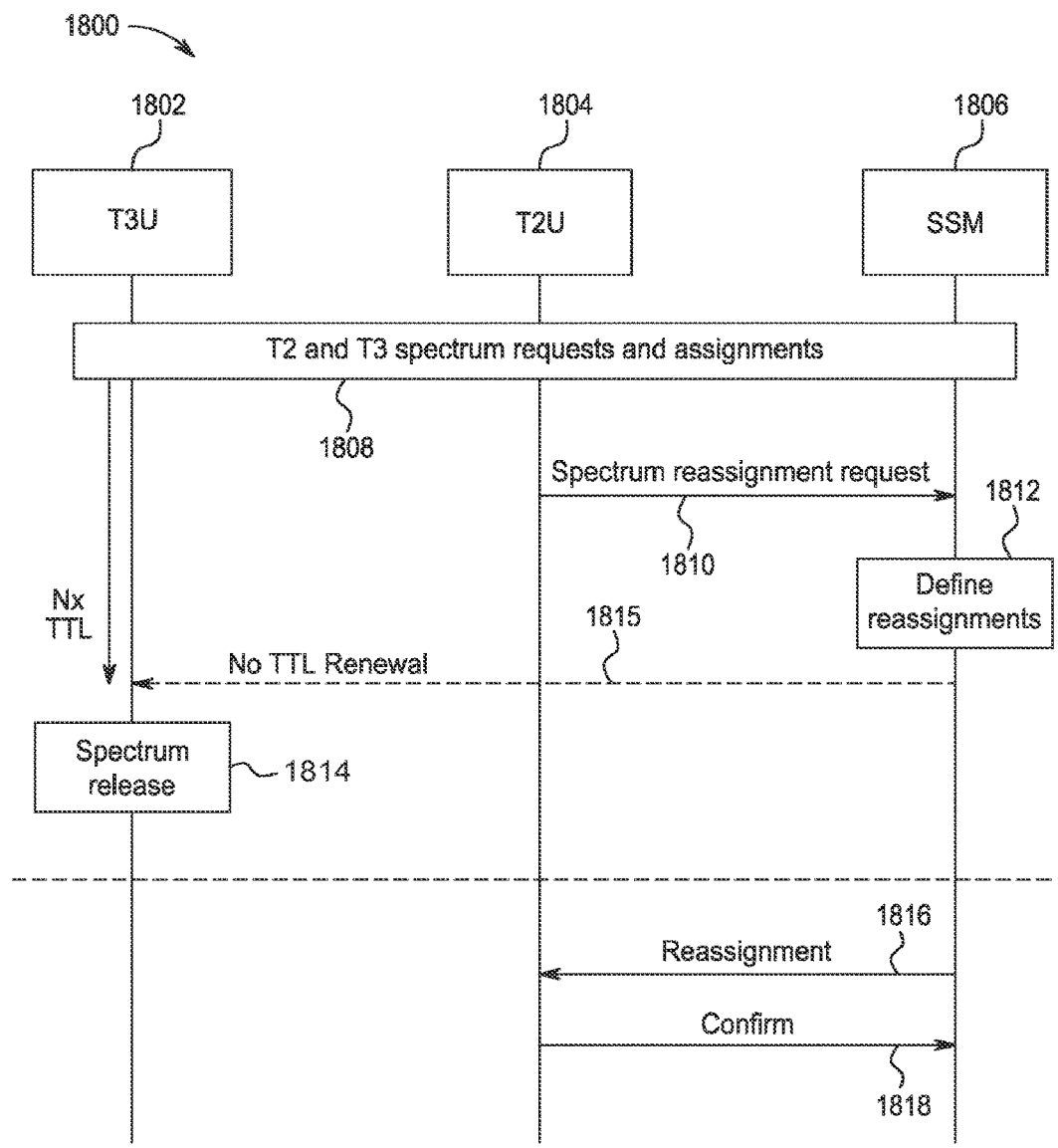
FIG. 18 shows a signal flow diagram of an example reassignment request procedure.

According to an embodiment, to support changes in the needs of T2U spectrum, a T2U may send a reassignment request to the SSM. FIG. 18 shows a signal flow diagram of an example reassignment request procedure 1800, involving a T3U 1802, a T2U 1803 and an SSM 1806. T2 and T3 spectrum requests and assignments, 1808, may occur between the T3U 1802, the T2U 1803 and the SSM 1806.

The T2U 1804 may send spectrum reassignment request 1808 to the SSM 1806, which may contain information including, but not limited to the following: the reason for the request, details of how much more/less spectrum is needed, the relevant geographical coverage, and/or the required time duration of the additional spectrum.

In case additional spectrum may be needed by the T2U, the SSM may perform a reassignment and/or optimization procedure, 1812, to check the availability of suitable additional spectrum. If the T3U spectrum may be used as a buffer, and it may be fully utilized, the required amount may be released from T3U use either by not renewing at least one TTL (e.g. N×TTL, where N≥1), 1815, or if the TTL is too long by sending an evacuation command to some of the T3Us (not shown). In an example not shown, the SSM 1806 may perform the optimization of all assignments at the same time, and then the SSM 1806 may inform all affected users about changed assignments.

In case of less spectrum is needed by the T2U 1804, the SSM 1806 may make the released spectrum available for new use and may define reassignments, 1812, possibly associated with optimization that may take into account the release of spectrum. The portion of spectrum that may become available may be made available to the T2U 1804 (and/or the T3U 1802) via a reassignment message, 1816, which may be confirmed by the T2U 1804 via a confirmation message 1818. The optimization may be done immediately or in line with the regular periodicity.

In a further example, if incentive auctions have been used the SSM may send revised assignments and the reimbursement information to the T2U that released some of its spectrum. It may also be possible that the SSM does the optimization of the all assignments at the same time, and then all relevant (changed) assignments may be told to the users by the SSM. If incentive auctions are used, and they would end up in awarding the requested additional spectrum to the T2U which requested more spectrum, or if other pricing mechanisms may be in use, the SSM may send revised assignments and/or billing information to a T2U.

According to an embodiment, congestion predictions apply to scenarios where there may not be enough spectrum to accommodate the offered traffic. This may occur in any of the following example situations. For example, the spectrum requirements from T2U and T3U may increase until the capacity made available from the T1U may not enough to accommodate the demand. In another example, the T1U may want back some or the entire spectrum it has made available through the SSM and the SSM may have assigned it to other use. In another example, the T2U may need more spectrum and the SSM may have assigned all spectrum for T2U and T3U use.

According to an embodiment, congestion may be reduced or avoided by employing predictions to be done by the SSM based on analysis of past traffic amounts and traffic patterns. The SSM may collect information from the T2Us on the timely variance of the traffic demand over a time period, such as a day or a week, for example. By using the knowledge of the traffic patterns, the SSM may manage the spectrum to maximize the efficiency of the overall spectrum use and ensure that the T2Us has QoA during their assignments, even if there will be changes in the spectrum requirements or radio environment.

The SSM may collect information about the past traffic and its trend and changes over a time period such as a day or a week, for example. The SSM may use this information to make traffic predictions to help ensure that there is enough spectrum regardless of timely variance for the users that require QoA. The SSM may use the collected information to maintain a spectrum buffer that helps in assigning additional spectrum when more capacity is needed by a T2U.

Spectrum in such a buffer may be made available for use under the assumption that the users may need to be evacuated in case the spectrum in the buffer is needed for T2Us. Examples of events that may cause buffer evacuation include harmful interference emerging causing a need for reassignment, new spectrum requests that ask for relatively wide new bandwidth, and mission critical applications that need spectrum very rapidly.

In general, the use of a buffer may increase the assignment flexibility of the SSM. For example, tier 3 spectrum may serve as such buffer, or specific buffer spectrum may be reserved by the SSM. The use of a buffer may also be a topic for a policy issued by the administration (e.g. a regulator).

Figure 19:
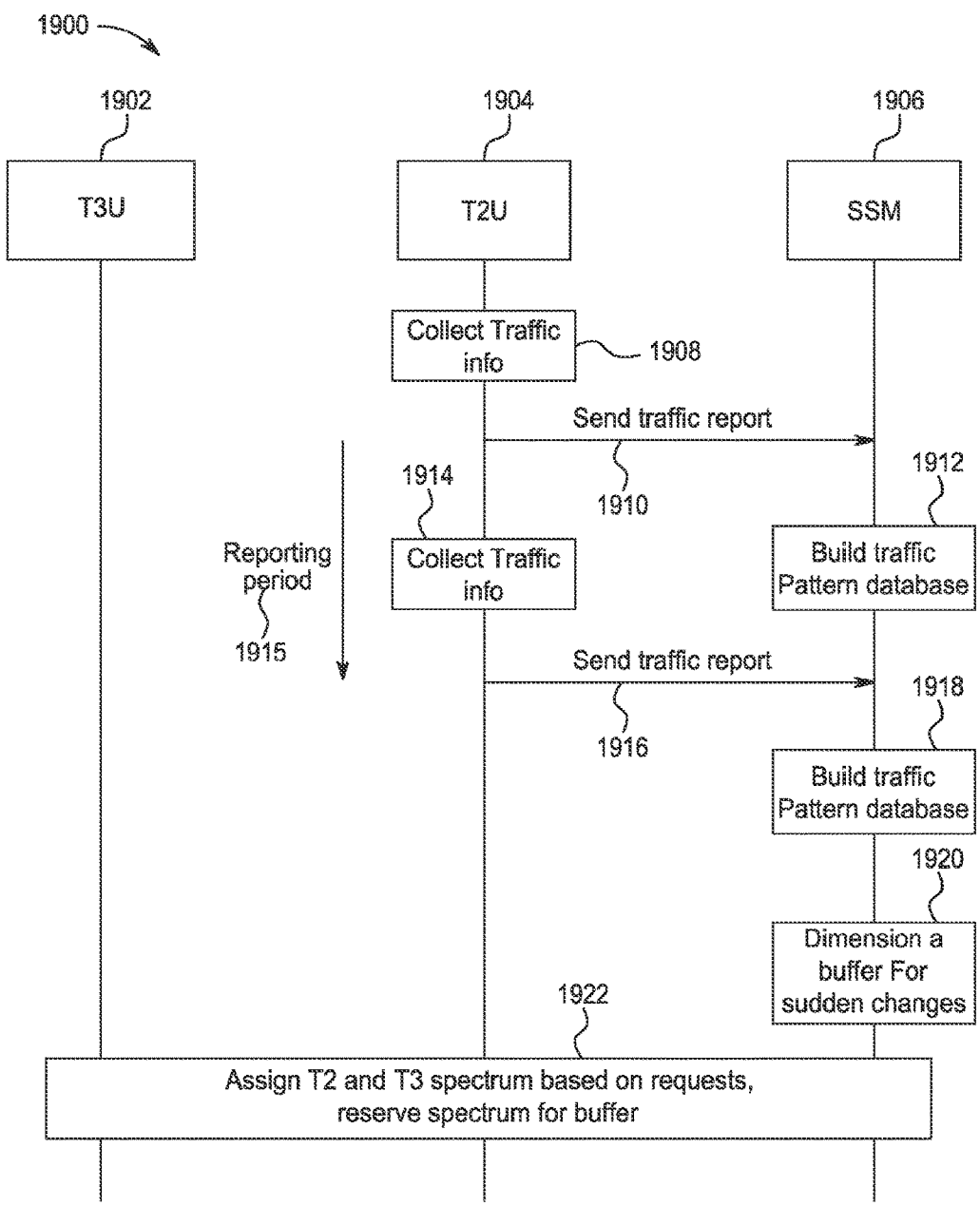
FIG. 19 shows a signal flow diagram of an example T2U traffic information collection procedure for prediction to be used in buffer dimensioning.

FIG. 19 shows a signal flow diagram of an example T2U traffic information collection procedure 1900 for prediction to be used in buffer dimensioning. During a reporting period 1915, the T2U 1904 may periodically collect traffic information, 1908 and 1914, and send periodic traffic reports, 1910 and 1916, to the SSM 1906. The SSM 1906 may build and add to a traffic pattern database, 1912 and 1918, based on the received traffic reports 1910 and 1916. Based on the traffic patterns, the SSM 1906 may dimension a buffer for sudden changes in spectrum needed by higher users, 1920. The SSM 1906 may then assign spectrum to the T2U 1904 and the T3U 1902 based on spectrum requests, and may reserve spectrum for the buffer, 1922.

According to an example, predictions may be used to set an upper limit for the amount of spectrum assigned to users. For example, a spectrum limit may be set per user category (e.g. enterprise WiFi user, or LTE operator) or per individual user. The spectrum limit may facilitate sufficient capacity for a certain percentage of time, for example for 95% of the time. Deriving such a limit may allow the SSM to manage its spectrum in accordance with the policy related to fairness in spectrum assignments. The spectrum limit may be determined based on collecting information about the past spectrum use, including the variance over the time, and taking into account the amount that the T1U has made available for lower tiers.

According to an embodiment, spectrum may be reclaimed by a T1U. Unless the portions of spectrum that are left unused by the T1U remain unused permanently, for example due to technical or operational reasons of the T1U, there may be instances where the T1U may need back portions of or the whole spectrum it has made available for other use through the SSM.

According to an approach, the T1U may use spectrum occasionally or in a periodic manner. The periodicity may be constant or varying over time. If the T1U need for spectrum is periodic, the SSM may accordingly release the spectrum periodically back to the T1U. If the timing of the periodicity is known beforehand (e.g at the time of the spectrum offer), the SSM may take the periodicity into account when it assigns spectrum for T2Us and T3Us. The TTLs values of the assignments to T2Us and/or T3Us may be determined so that the spectrum becomes automatically available to the T1U when needed. This may assume that the TTLs are not renewed.

According to another approach, the SSM may define the assignment duration in an exact manner. According to either approach, there may be no need for a spectrum reclaim or evacuation commands from the SSM. In case the T1Us use spectrum occasionally, and those occasions are known well beforehand, the SSM may use the same timing mechanisms as in the case of periodic use.

Figure 20:
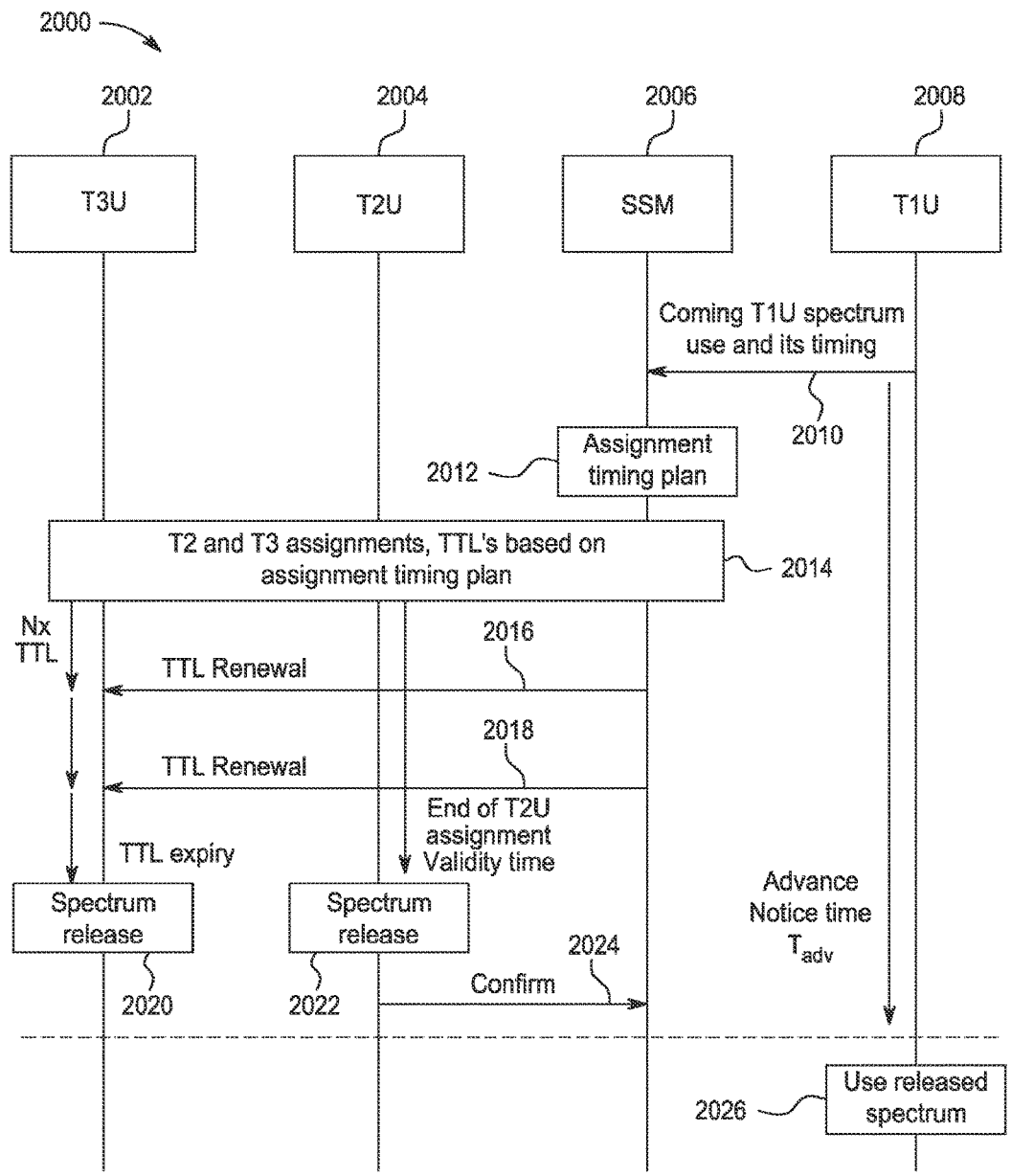
FIG. 20 shows a signal flow diagram of an example of a periodic spectrum use procedure for a T1U.

FIG. 20 shows a signal flow diagram of an example periodic spectrum use procedure 2000 for a T1U 2008. The system in FIG. 20 includes T3U 2002, T2U 2004, SSM 2006 and T1U 2008. The T1U 2008 may send a message 2010 to the SSM 2006 regarding the expected T1U spectrum use and its timing. For example, the T1U 2008 may determine and indicate to the SSM 2006 that it needs to reclaim the spectrum assigned to the lower tier users after an advance notice time $T_{adv}$. The SSM 2006 may determine an assignment timing plan, 2012, based on message 2010 and may provide T2 and T3 assignments and TTLs based on the assignment timing plan, 2014, to the T2U 2004 and the T3U 2002.

The SSM 2006 may send TTL renewal messages, 2016 and 2018, to the T3U 2002 during a $T_{adv}$ time period when the spectrum is not needed by the T1U 2008. Following the TTL expiry for the T3U 2002 and the end of the T2U assignment validity time for the T2U 2004, the T3U 2002 and T2U may respectively release spectrum, 2020 and 2022. The T2U 2004 may send a confirmation message 2024 to the SSM 2006 to confirm that the spectrum was released. The T1U 2008 may then reclaim and use the released spectrum, 2026.

Figure 21:
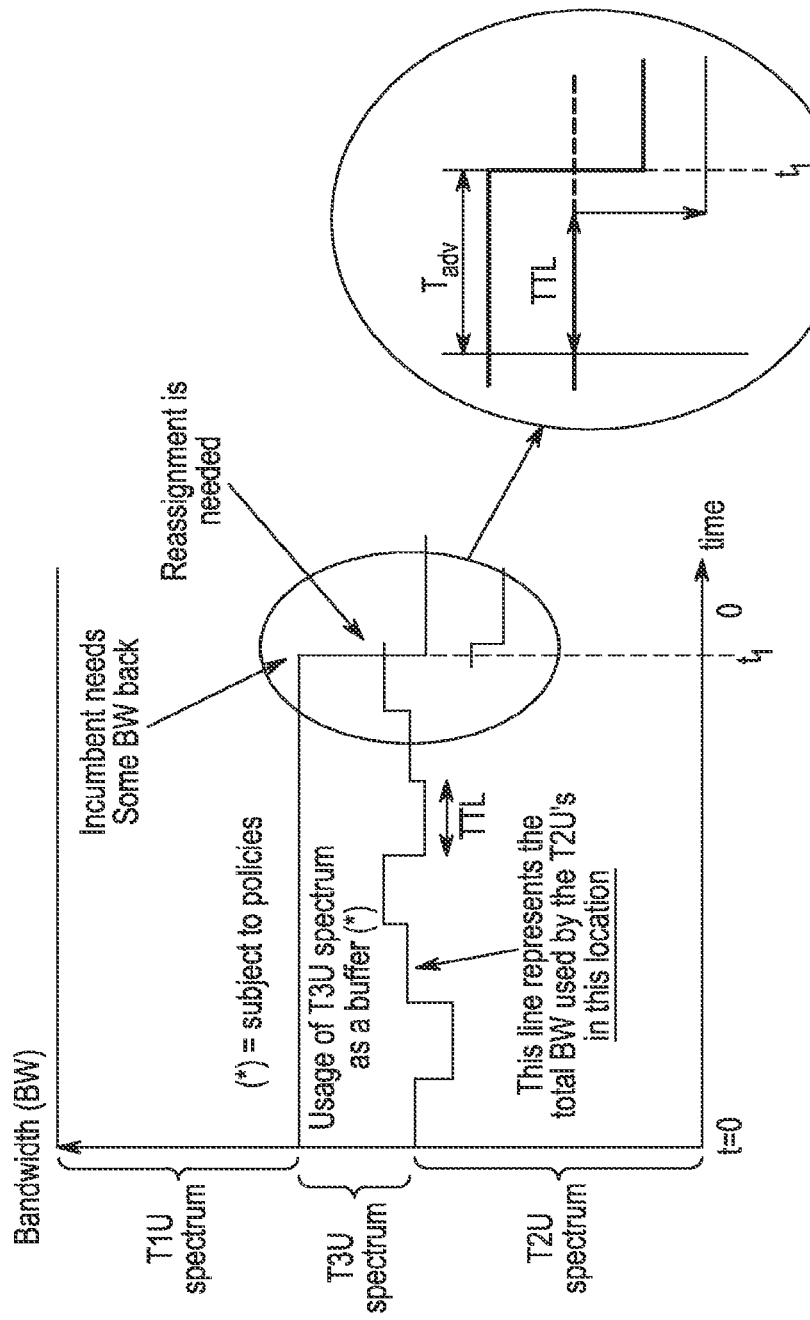
FIG. 21 shows an example 3-tiered spectrum model where a T1U needs some bandwidth back that has been assigned to lower tier users.

According to an embodiment, there may emerge an unexpected need for a T1U to use more spectrum while the unused spectrum of the T1U has been assigned to other users. In other words, the T1U may need some of its spectrum back. In this case, the T1U may send a reclaim request to the SSM. FIG. 21 shows an example 3-tiered spectrum model where a T1U needs some bandwidth back that has been assigned to lower tier users. According to the example in FIG. 21, the incumbent has a need for additional spectrum starting at time $t_1$, at which time reassignment of spectrum for the T3U and/or the T2U may be used.

Approaches for handling T1U spectrum reclaim from the spectrum assignment point of view are described below.

According to an approach, the reclaim amount may be less than the spectrum in the buffer (e.g. the spectrum assigned to the T3U). In this case, only T3U assignments may be affected immediately. To carry out the reclamation, the SSM may not send a TTL renewal and/or may send evacuate commands to T3U(s). If evacuation commands are available, the approach may be as fair towards the T3Us as possible, when some of them are left without spectrum, or their bandwidths may be reduced. The SSM may need to "rebuild" sufficient buffer after the reclaim.

According to another approach, a spectrum change may be more than the spectrum in the T3U buffer. In this case, in addition to all T3Us, the T2Us may also be affected. Action may depend on the timing. For example, it may depend on how long in advance, $T_{adv}$, the T1U informs the SSM regarding the need for additional spectrum, and whether $T_{adv}$ is longer or shorter than the TTLs and/or the assignment validity times.

If $T_{adv}$>TTL, then TTLs may expire during $T_{adv}$ and the assignment renewals may be done so that the T1U gets sufficient spectrum. This may assume that T3Us are using spectrum based on TTLs, and that T2Us use spectrum based on TTLs or assignment validity times. For a T2U in this scenario, some or all of the T2U's may not receive a TTL renewal message and/or may receive an evacuate command. Additionally, the bandwidth assigned to T2Us may be reduced. For example, a T2U's bandwidth may be cut or reduced by a given percentage. This may be done by the SSM sending a reassignment command to the T2U.

The impact of the bandwidth reclaim may be shared between T2Us in the time domain. For example, the time in which the T1U may use the spectrum may be divided into portions, and in each portion one of the T2U either may not have its TTL renewed (or may receive an evacuation message), or may have its bandwidth cut. This may be implemented by the SSM sending spectrum reassignments for each time portion.

If $T_{adv}$<TTL, then some TTLs may expire only after $T_{adv}$ may have passed. In this case a "kill switch" approach may be employed, such that the SSM may send an immediate evacuate command to the affected users before the TTLs expire. Use of evacuate commands may allow usage of longer TTLs, while allowing quick evacuation of spectrum for reclaim.

In all the above cases, the QoA of T2Us may be affected. This may be avoided, but if it happens, there may be a need for compensation. The risk of such spectrum availability reduction may be embedded beforehand in the price paid by a T2U for its spectrum. If possible, the time parameters may be chosen such that $T_{adv}$>TTL.

Figure 22:
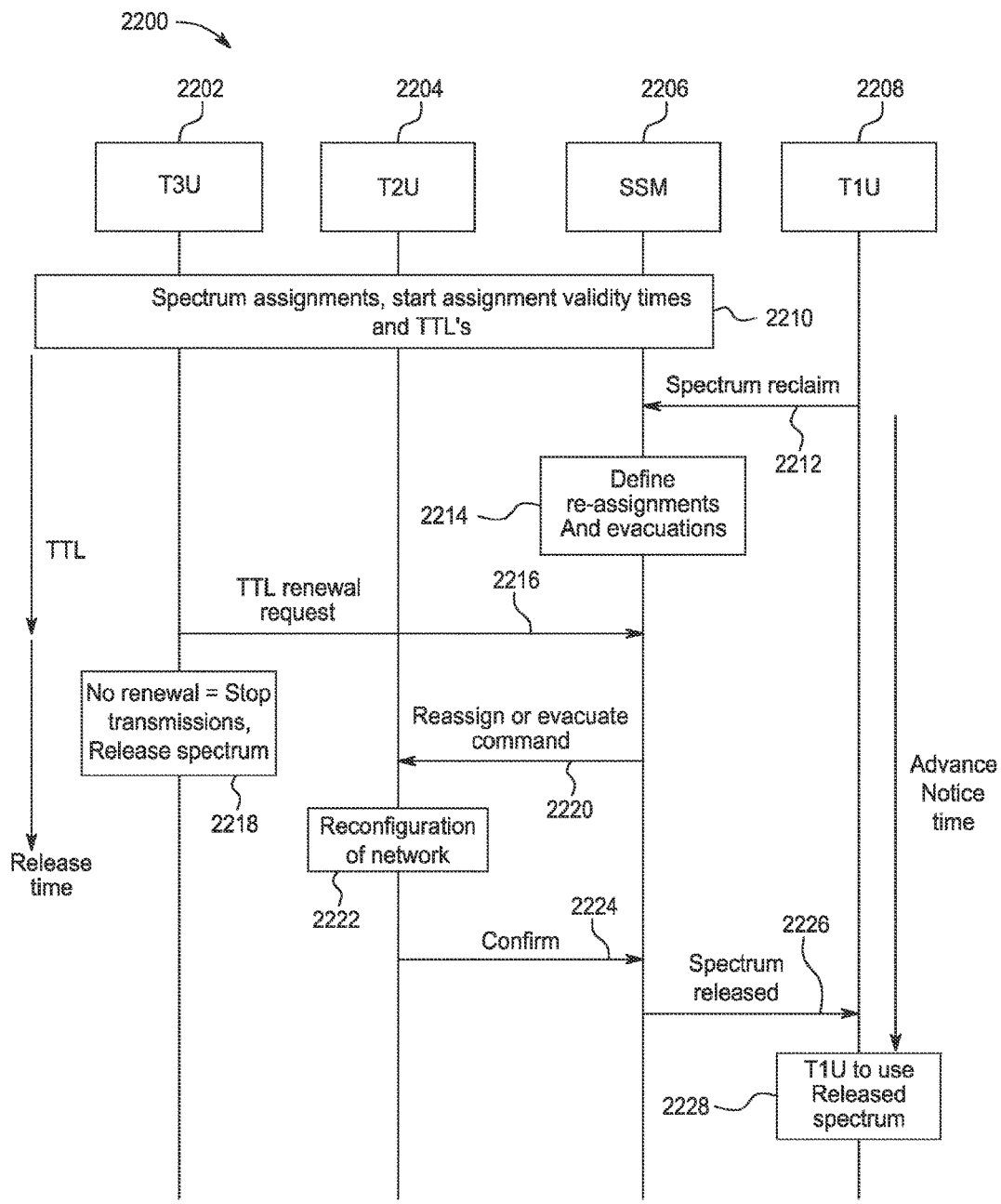
FIG. 22 shows a signal flow diagram of an example spectrum reclaim procedure for a T1U.

FIG. 22 shows a signal flow diagram of an example spectrum reclaim procedure 2200 for a T1U 2208. In this example, it is assumed that the T3U 2202 uses the TTL mechanism, $T_{adv}$>TTL, and the T2U 2204 uses assignment validity time mechanism, such that the SSM 2206 may send a reassignment or evacuate command to the affected T2U 2204.

In the example of FIG. 22, spectrum assignments may initiate the start of validity times and TTLs, 2210, for the T2U 2204 and the T3U 2204. The T1U 2208 may send a spectrum reclaim message 2212 to the SSM 2206 indicating an advance notice time for the reclamation. The SSM 2206 may define reassignments and evacuations of spectrum, 2214, in accordance with the spectrum reclaim message 2212. If the SSM 2206 receives a TTL renew request message, 2216, from the T3U 2206, the SSM may not renew the assignment. In the case of no renewal, the T3U 2202 may stop transmissions and release the spectrum, 2218.

Meanwhile, the SSM 2206 may send a reassignment and/or evacuation command 2220 to the T2U 2204, which may reconfigure its network to release spectrum, 2222. The T2U 2204 may send a confirmation message 2224 to the SSM 2206 to confirm that the spectrum was released. The SSM 2206 may in turn send a spectrum released message 2226 to the T1U 2208 to notify the T1U 2208 that the spectrum it requested is available. At the end of the advance notice time, the T1U may use the released spectrum, 2228.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A shared spectrum manager configured to manage spectrum allocation for multi-tiered licensed and unlicensed access users, the shared spectrum manager comprising:
   a receiver configured to receive, from a wireless transmit/receive unit (WTRU), interference measurements, wherein the WTRU is a second tier licensed access user;
   a processor configured to calculate a protection area for the WTRU in which the WTRU is protected from harmful interference from lower tier users;
   the receiver further configured to receive, from the WTRU, a spectrum assignment request message;
   in response to the received spectrum assignment request message, the processor configured to generate an assignment message assigning a portion of available spectrum and operation conditions to the WTRU based on the protection area; and
   a transmitter configured to send, to the WTRU, the assignment message.

2. The shared spectrum manager of claim 1, wherein:
   the processor is further configured calculate an updated protection area for the WTRU and generate an updated assignment message assigning a new portion of available spectrum and new operation conditions to the WTRU based on the updated protection area for the WTRU.

3. The shared spectrum manager of claim 1, wherein the portion of the available spectrum and the operation conditions have an associated time-to-live (TTL).

4. The shared spectrum manager of claim 1, wherein the lower tier users include general authorized access users.

5. The shared spectrum manager of claim 1, wherein the lower tier users include unlicensed users.

6. The shared spectrum manager of claim 1, wherein the receiver is further configured to receive, from the WTRU, a registration message.

7. The shared spectrum manager of claim 1, wherein the protection area is defined in terms of technology and sub-band.

8. The shared spectrum manager of claim 1, wherein the protection area prevents the WTRU from causing harmful interference to first tier incumbent users.

9. A method, performed by a shared spectrum manager, for managing spectrum allocation for multi-tiered licensed and unlicensed access users, the shared spectrum manager comprising:
receiving, from a wireless transmit/receive unit (WTRU), interference measurements, wherein the WTRU is a second tier licensed access user;
calculating a protection area for the WTRU in which the WTRU is protected from harmful interference from lower tier users;
receiving, from the WTRU, a spectrum assignment request message;
in response to the received spectrum assignment request message, generating an assignment message assigning a portion of available spectrum and operation conditions to the WTRU based on the protection area; and
sending, to the WTRU, the assignment message.

10. The method of claim 9, further comprising:
calculating an updated protection area for the WTRU; and
generating an updated assignment message assigning a new portion of available spectrum and new operation conditions to the WTRU based on the updated protection area for the WTRU.

11. The method of claim 9, wherein the portion of the available spectrum and the operation conditions have an associated time-to-live (TTL).

12. The method of claim 9, wherein the lower tier users include general authorized access users.

13. The method of claim 9, wherein the lower tier users include unlicensed users.

14. The method of claim 9, further comprising:
receiving, from the WTRU, a registration message.

15. The method of claim 9, wherein the protection area is defined in terms of technology and sub-band.

16. The method of claim 9, wherein the protection area prevents the WTRU from causing harmful interference to first tier incumbent users.

17. A wireless transmit/receive unit (WTRU) configured as a second tier licensed access user, the WTRU comprising:
a receiver configured to measure interference in at least one channel to generate interference measurements;
a transmitter configured to send, to a shared spectrum manager, the interference measurements;
the transmitter configured to send, to the shared spectrum manager, a spectrum assignment request message;
the receiver configured to receive, from the shared spectrum manager, an assignment message, wherein the assignment message assigns a portion of available spectrum and operation conditions to the WTRU and wherein the portion of available spectrum corresponds to a protection area for the WTRU in which the WTRU is protected from harmful interference from lower tier users; and
the transmitter configured to send data over the portion of the available spectrum in accordance with the assignment message.

18. The WTRU of claim 17, wherein the protection area prevents the WTRU from causing harmful interference to first tier incumbent users.

19. The WTRU of claim 17, wherein the portion of the available spectrum and the operation conditions have an associated time-to-live (TTL).

20. The WTRU of claim 19, wherein on a condition of an expiration of the TTL:
the transmitter is further configured to send, to the shared spectrum manager, a spectrum assignment renewal request message;
the receiver is further configured to receive, from the shared spectrum manager, an updated assignment message assigning a new portion of the available spectrum and new operation conditions to the WTRU; and
the transmitter further configured to send data over the new portion of the available spectrum in accordance with the updated assignment message.

* * * * *